US010922233B2

(12) United States Patent
Shergill et al.

(10) Patent No.: US 10,922,233 B2
(45) Date of Patent: Feb. 16, 2021

(54) STORAGE CLASS MEMORY QUEUE DEPTH THRESHOLD ADJUSTMENT

(71) Applicant: HEWLETT PACKARD ENTERPRISE DEVELOPMENT LP, Houston, TX (US)

(72) Inventors: Gurinder Shergill, San Ramon, CA (US); Kouei Yamada, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/389,266

(22) Filed: Apr. 19, 2019

(65) Prior Publication Data

US 2020/0334163 A1 Oct. 22, 2020

(51) Int. Cl.
  *G06F 12/0888* (2016.01)
  *G06F 12/0811* (2016.01)
(52) U.S. Cl.
  CPC ...... *G06F 12/0888* (2013.01); *G06F 12/0811* (2013.01); *G06F 2212/1024* (2013.01)
(58) Field of Classification Search
  USPC ................................. 711/122, 138
  See application file for complete search history.

(56) References Cited

U.S. PATENT DOCUMENTS

| 6,912,612 | B2 | 6/2005 | Kapur et al. |
| 6,922,754 | B2 | 7/2005 | Liu et al. |
| 7,356,651 | B2 | 4/2008 | Liu et al. |
| 7,739,470 | B1* | 6/2010 | Norgren ............... G06F 11/3485 709/224 |
| 8,892,716 | B2 | 11/2014 | Gulati et al. |
| 9,213,628 | B2 | 12/2015 | Maheshwari et al. |
| 9,489,141 | B2 | 11/2016 | Nanduri et al. |
| 9,720,601 | B2 | 8/2017 | Gupta et al. |
| 9,779,026 | B2 | 10/2017 | Kumar et al. |
| 2004/0136712 | A1* | 7/2004 | Stiscia ................... H04J 3/1694 398/60 |
| 2006/0179240 | A1 | 8/2006 | Chatterjee et al. |
| 2009/0327481 | A1* | 12/2009 | Rickard .............. G06F 11/3419 709/224 |
| 2012/0047318 | A1 | 2/2012 | Yoon et al. |
| 2012/0072670 | A1* | 3/2012 | Jess ...................... G06F 12/0868 711/136 |
| 2012/0124294 | A1 | 5/2012 | Atkisson et al. |
| 2014/0379988 | A1 | 12/2014 | Lyakhovitskiy et al. |
| 2015/0106596 | A1 | 4/2015 | Vorbach et al. |

(Continued)

OTHER PUBLICATIONS

Arulraj, J. et al., "Let's Talk About Storage & Recovery Methods for Non-volatile Memory Database Systems," 2015, https://db.cs.cmu.edu/papers/2015/p707-arulraj.pdf.

(Continued)

*Primary Examiner* — William E. Baughman
(74) *Attorney, Agent, or Firm* — Hewlett Packard Enterprise Patent Department

(57) ABSTRACT

Examples include storage class memory (SCM) queue depth threshold adjustment. Examples may adjust the SCM queue depth threshold of a controller based on whether an IO request latency threshold for an SCM read cache is exceeded. Examples may determine whether to process an IO request using the SCM read cache based on an SCM queue depth of the controller and the SCM queue depth threshold.

20 Claims, 5 Drawing Sheets

(56) References Cited

U.S. PATENT DOCUMENTS

| | | | |
|---|---|---|---|
| 2015/0286438 A1* | 10/2015 | Simionescu | G06F 12/0888 711/103 |
| 2015/0355883 A1 | 12/2015 | Kegel | |
| 2016/0188223 A1* | 6/2016 | Camp | G06F 12/0868 711/103 |
| 2016/0291885 A1 | 10/2016 | Pendharkar et al. | |
| 2018/0081832 A1 | 3/2018 | Longo et al. | |
| 2019/0042452 A1* | 2/2019 | Clark | G06F 3/0625 |

OTHER PUBLICATIONS

Chris Siebenmann, "How to force a disk write cache flush operation on Linux," Oct. 24, 2013, <https://utcc.utoronto.ca/~cks/space/blog/linux/ForceDiskFlushes>.

Chris Siebenmann, "Modern disk write caches and how they get dealt with (a quick overview)," Oct. 25, 2013, <https://utcc.utoronto.ca/~cks/space/blog/tech/ModernDiskWriteCaches>.

Dulloor et al., "System Software for Persistent Memory," Apr. 13-16, 2014, EuroSys 2014, <https://courses.engr.illinois.edu/ece598ms/sp2018/papers/paper45.pdf>.

Huang, H. et al., "Performance Modeling and Analysis of Flash-based Storage Devices," May 23, 2011, IEEE, https://www2.seas.gwu.edu/~howie/publications/MSST11.pdf.

IBM Almaden Research Center, "MIEC* Access Device for 3D-Crosspoint Nonvolatile Memory Arrays," 2012,<https://researcher.watson.ibm.com/researcher/files/us-gwburr/MIECOverviewPublicDomain_Jan2013_3.pdf>.

ibm.com, "Storage Class Memory," Jan. 2013, https://researcher.watson.ibm.com/researcher/files/us-gwburr/Almaden_SCM_overview_Jan2013.pdf.

Jonathan Corbet, "The end of block barriers," Aug. 2010, <https://lwn.net/Articles/400541/>.

Margaret Rouse, "3D XPoint," Aug. 2017, <https://searchstorage.techtarget.com/definition/3D-XPoint>.

Michael Rink, "HPE Announcements From Discover Madrid 2018," Nov. 27, 2018, <https://www.storagereview.com/hpe_announcements_from_discover_madrid_2018>.

Wikipedia, "3D XPoint," Oct, 17, 2018, <https://en.wikipedia.org/w/index.php?title=3D_XPoint&oldid=864459675>.

Wikipedia, "Disk buffer," Oct. 13, 2016, <https://en.wikipedia.org/w/index.php?title=Disk_buffer&oldid=744111889>.

* cited by examiner

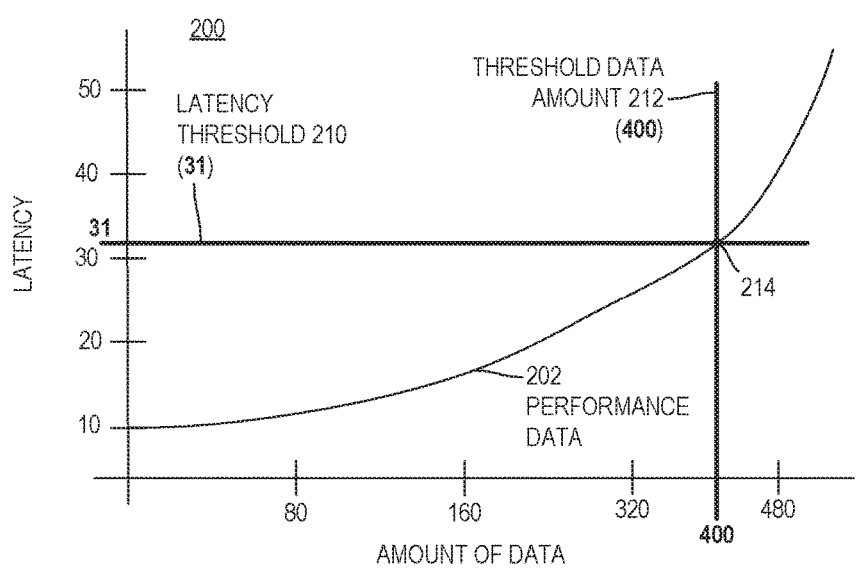
FIG. 2A
FIG. 2B
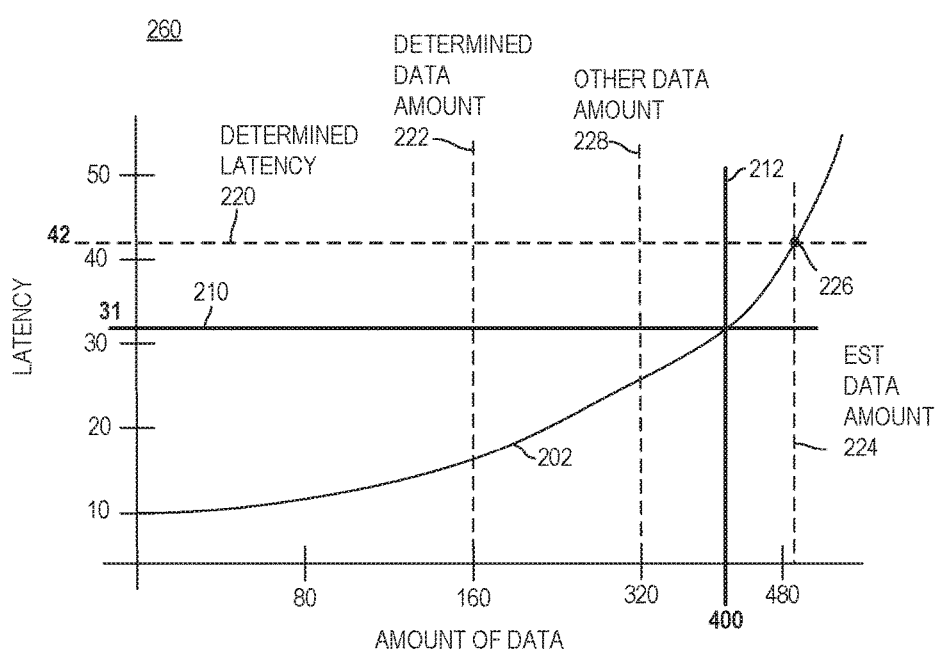
FIG. 2C

STORAGE CLASS MEMORY QUEUE DEPTH THRESHOLD ADJUSTMENT

BACKGROUND

In computing devices, such as servers, storage arrays, and the like, a processing resource may read from and write to cache memory with much lower latency compared to other types of storage (e.g., non-volatile storage, such as hard disk drives (HDDs), solid state drives (SSDs), or the like). However, while such cache memory may have much lower latency, it is often implemented using volatile memory device(s) that do not retain data stored therein when power is lost, and generally have a higher cost (per unit of capacity) compared to other types of storage (e.g., non-volatile storage, such as HDDs, SSDs, or the like).

BRIEF DESCRIPTION OF THE DRAWINGS

The following detailed description references the drawings, wherein:

FIG. 2A is a graph of example SCM device performance data and illustrating an example IO request latency threshold;

FIG. 2B is a table of example SCM performance data corresponding to the example graph of FIG. 2A;

FIG. 2C is a graph of the example SCM device performance data of FIG. 2A and illustrating a determined latency and an estimated data amount according to an example;

DETAILED DESCRIPTION

Figure 1:
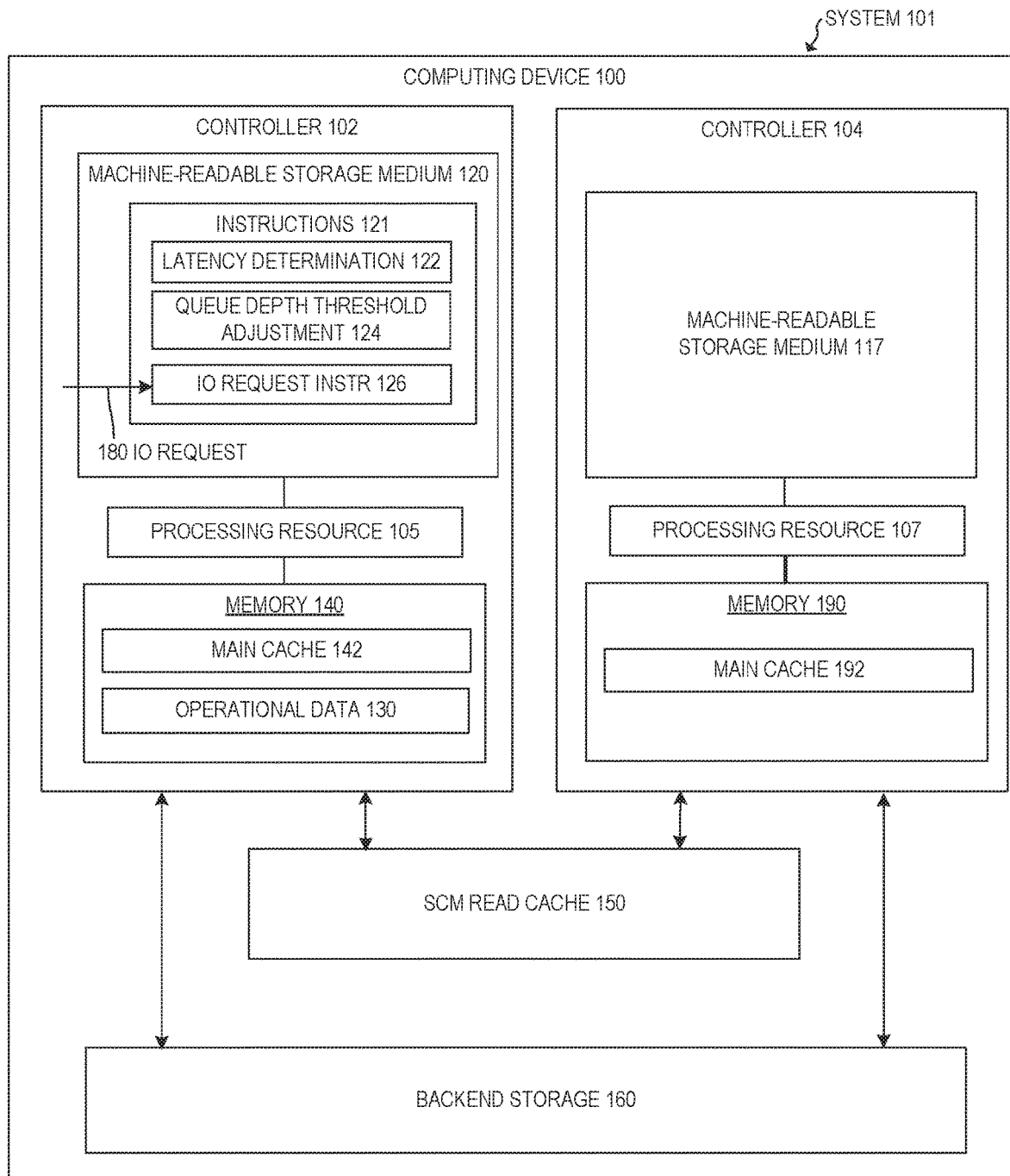
FIG. 1 is a block diagram of an example computing system to select whether to use a storage class memory (SCM) read cache based on an SCM queue depth threshold.

Computing devices, such as servers, storage arrays, and the like, may include cache memory implemented by volatile memory device(s) that do not retain data stored therein when power is lost. Such cache memory implemented by volatile memory device(s) may be referred to herein as "volatile cache memory" or as the "main cache" of a computing device. Such volatile cache memory may be implemented by dynamic random-access memory (DRAM) device(s), which may be provided in the form of dual in-line memory modules (DIMMs), for example. Such computing devices may also include other types of storage, such storage implemented by non-volatile storage device(s) that may retain the data stored therein even when they lose power. Such non-volatile storage device(s) (e.g., HDDs, SSDs, or a combination thereof), or the like, may be used by a computing device (such as a storage array) to implement "back-end storage" for the computing device (e.g., storage array) for the persistent storage of data in the computing device. Such storage device(s) may be accessed using various communication protocols, such as those related to Small Computer System Interface (SCSI) (e.g., Serial Attached SCSI (SAS)), Serial AT Attachment (SATA), or other suitable protocol(s).

In such computing devices, processing resource(s) of a controller of the computing device may read data from and write data to the memory device(s) implementing the volatile cache memory with much lower latency (i.e., much faster) than from storage device(s) implementing backend storage for the computing device (e.g., HDDs, SSDs, etc., or a combination thereof). However, the capacity of the volatile cache memory be relatively low compared to the backend storage, so the volatile cache memory may be limited to storing only a small subset of the data stored by the computing device at one time (e.g., much less than all of the data stored in the backend storage of the computing device). In such examples, just a relatively small proportion of the data stored in the backend storage of the computing device may be accessible from the cache memory (with the low latency it provides) at a given time.

In some examples, it may be beneficial to extend the capacity of the main cache (e.g., volatile cache memory) of a computing device using non-volatile storage as an extended read cache (or "intermediate" read cache) that is logically placed between the main cache and the backend storage (e.g., other non-volatile storage device(s)) of a computing device. Even though such an extended read cache may have higher latency than the main cache, the extended read cache may have much lower latency than the backend storage of the computing device, and so when there is a cache miss at the main cache (i.e., requested data is determined not to be present in the main cache), reading the requested data from the extended read cache (if present therein) may allow the requested data to be read into the main cache with much lower latency than reading the requested data into the main cache from the backend storage of the computing device.

For example, when there is a cache miss at the main cache, reading the requested data from a SAS HDD of backend storage into the main cache may take one or more milliseconds (ms) (or more, depending on present utilization of the SAS HDD), thereby adding at least one or more milliseconds of latency to the requested read. Reading the requested data from a SAS SSD (e.g., comprising a flash translation layer (FTL)) of backend storage into the main cache may take about 125 or more microseconds (or more, depending on its present utilization), which may still thereby add significant additional latency to the requested read. Similarly, reading the requested data into the main cache from a SAS SSD (e.g., comprising an FTL) as extended read cache (i.e., when the above-described extended read cache is implemented using one or more SAS SSDs) may also take about 125 or more microseconds (or more, depending on present utilization of the SAS HDD), thereby adding significant additional latency to the requested read.

In contrast, when the extended read cache is implemented using storage class memory (SCM) device (e.g., a solid-state, non-volatile storage device not comprising an FTL), the requested data may be read into the main cache from the SCM device implementing the extended read cache as quickly as a number of microseconds in the low teens in some examples, thereby significantly reducing the added latency to read the data into the main cache compared to SAS SSDs (e.g., approximately 10 times lower latency), for example. In examples described herein, an SCM device (or card) implementing the extended read cache (at least in part) may be referred to herein as an "SCM read cache".

However, a single SCM device (which may be referred to as an SCM "card" herein) may have a limited rate (e.g., "data rate" or "bandwidth" herein) at which data may be read from and written to the SCM card with low latency. For example, a single SCM card may have a data rate threshold of about 2.4 GB/sec, below which data may be read from or written to the SCM card with low latency. In such examples, when enough input/output (IO) requests (or "IOs" herein; e.g., read and/or write requests) are issued to the SCM device quickly enough that the cumulative amount of data that these IO requests are attempting to read and/or write to the SCM device exceeds the data rate threshold (e.g., about 2.4 GB/sec in some examples), further IO requests issued may experience much higher latency than those IO requests issued before that threshold was exceeded. For example, IO requests issued after the data rate threshold is exceeded may experience latency (e.g., time to read from the SCM device into the main cache) that is near or even greater than the above-described latency of a SAS SSD (e.g., about 125 microseconds or more).

In such examples, issuing IO requests to the SCM device such that the data rate threshold is exceeded may lead to an unexpected increase in latency for those IO requests issued after the threshold is exceeded. In such examples, it may be possible to get lower latency by bypassing the SCM device and reading from the backend storage rather than from the SCM device once the data rate threshold of the SCM card has been exceeded. However, in examples in which the SCM device is utilized by multiple controllers of a computing device such as a storage array (e.g., when the SCM device is dual-ported), it may be difficult for any one of the controllers to determine the cumulative amount of data being read from and written to the SCM device by the multiple controllers in a given time period, and thus whether that cumulative amount of data exceeds the data rate threshold for the SCM card.

To address these issues, in examples described herein, a given controller may determine a representative IO request latency (e.g., average IO request latency) between the given controller and an SCM device, and compare the representative IO request latency to a latency threshold that corresponds to a data rate threshold for the SCM device. In such examples, the representative IO request latency exceeding the latency threshold may (indirectly) indicate that the data rate threshold for the SCM device is exceeded.

For example, the IO request latency for an SCM device (i.e., the time it takes the SCM device to complete an IO request) in a given time period may have a stable relationship to the cumulative amount of data being read from and written to the SCM card in the given time period. In such examples, that relationship may be used to determine an IO request latency value corresponding to the data rate threshold for the SCM device (e.g., corresponding to the threshold amount of data representative of the data rate threshold). In such examples, the determined latency value may be used as a latency threshold for the SCM device.

In such examples, each controller using the SCM device may experience approximately the same IO request latencies in a given time period, based on the cumulative amount of data read from and written to the SCM device in the given time period, regardless of the proportion of the cumulative amount of data each controller reads/writes in the given time period. As such, even though an individual controller may not be able to readily measure (directly) the cumulative amount of data read from and written to the SCM device in a given time period, a controller may directly observe IO request latencies between the controller and the SCM device, and utilize those observed IO request latencies to determine whether the IO request latency threshold for the SCM device is being exceeded, which may indicate (e.g., indirectly) that the cumulative amount of data being read from and written to the SCM device in the given time period by the multiple controllers exceeds the data rate threshold. In such examples, the individual controller may manage the rate at which data is transferred by that controller to and from the SCM read cache, based on whether the representative IO request latency exceeds the latency threshold for the SCM card (e.g., SCM read cache).

In this manner, in examples described herein, a given controller may manage the rate at which it reads from and writes to an SCM read cache after a data rate threshold for the SCM read cache is exceeded by the cumulative data amount from all of the controllers in a given time period, even though the given controller may not be able to (directly) measure the cumulative data amount from all of the controllers in the given time period, and in particular may not be able to directly measure the amount of data read/written by other controller(s), to thereby avoid or reduce the number of its IO requests that suffer significantly higher latency.

For example, examples described herein may, determine a representative IO request latency between a first controller and an SCM read cache during a given time period, and adjust at least one SCM queue depth threshold of the first controller, when the representative IO request latency exceeds an IO request latency threshold for the SCM read cache. In such examples, in response to an IO request of the first controller for the SCM read cache, the first controller may compare an SCM queue depth of the first controller to an SCM queue depth threshold of the first controller. In such examples, based on a type of the IO request and a result of the comparison, the first controller may select between (1) processing the IO request using the SCM read cache, (2) dropping the IO request, and (3) processing the IO request without using the SCM read cache, and may perform the selected processing or dropping.

In this manner, examples described herein may enable a controller to reduce the number of IO requests issued to the SCM read cache that suffer significantly higher latency due to the data rate threshold of the SCM read cache being exceeded, even when the controller may not readily be able to directly measure the cumulative amount of data that is read from and written to the SCM read cache in a given time period.

FIG. 1 is a block diagram of an example computing system 101 to select whether to use an SCM read cache 150 based on an SCM queue depth threshold. In the example illustrated in FIG. 1, computing system 101 (or "system" or "storage system" 101) comprises controllers 102 and 104, an SCM read cache 150, and backend storage 160. Backend storage 160 may comprise one or more storage devices to persistently store data for computing device 100. In such examples, each of the storage device(s) of backend storage 160 may be a non-volatile storage device, such as a HDD, a SSD, or the like, or any combination thereof. For example, backend storage 160 may comprise HDDs, SSDs, or a combination of HDDs and SSDs. Computing device 100 may be any suitable type of computing device as described herein, such as a server, a storage array, or the like.

In the example of FIG. 1, controller 102 comprises at least one processing resource 105 and at least one machine-readable storage medium 120 comprising (e.g., encoded with) at least instructions 121 that are executable by the at least one processing resource 105 of computing device 100 to implement functionalities described herein in relation to instructions 121. Instructions 121 may include at least instructions 122, 124, and 126, which may be executable by the at least one processing resource 105. Controller 102 may also comprise memory 140, which may be implemented by volatile memory (e.g., one or more volatile memory devices, such as DRAM device(s), DIMM(s), or the like). Memory 140 may implement main cache 142 of controller 102 (e.g., for use by processing resource 105 of controller 102). In some examples, memory 140 may also store various operational data 130, described in more detail below (see, e.g., FIG. 4). In some examples, data 130 may be stored on the same memory device or device(s) that implement main cache 142. In other examples, data 130 may be stored on different memory device(s) than the memory device(s) that implement main cache 142.

In the example illustrated in FIG. 1, SCM read cache 150 may be implemented by an SCM device (e.g., an SCM chip) to store data in a non-volatile manner. In examples described herein, controller 102 may utilize the SCM read cache 150 to extend the capacity of main cache 142 for servicing read requests. SCM read cache 150 may be logically (or functionally) between main cache 142 and backend storage 160 and may be referred to as an "intermediate" read cache herein. For example, data may be destaged from the main cache 142 into SCM read cache 150 such that the data may subsequently be read back into main cache 142 from SCM read cache 150 to avoid the higher latency process of reading the data into main cache 142 from backend storage 160.

In examples described herein, SCM may be a type of non-volatile memory (NVM) technology that is solid-state and has relatively low latency, and an SCM device may be a non-volatile storage device comprising SCM technology useable to store data thereon. For example, some types of solid data drive (SSD), such as a flash memory device, may comprise a flash translation layer (FTL). In some examples, an SCM device may have no FTL. In such examples, an SCM device having no FTL may have much lower latency than an SSD comprising an FTL. In such examples, the SCM device may be able to perform data writes that overwrite data at physical locations on the SCM device without first erasing existing data present at those physical locations of the SCM device, in contrast to flash memory devices using an FTL, in which writing to a physical location where data is present may involve first erasing the existing data at those physical locations before writing new data to those physical locations. In addition, with the omission of the FTL, an SCM device may not perform garbage collection, while a flash memory device comprising an FTL may perform garbage collection.

In some examples, an SCM device may communicate (e.g., with other components of system 101) using a protocol consistent with NVM Express™ (NVMe™), and an SCM that communicates using such a protocol may have lower latency than an SSD that communicates using a protocol such as SAS. In examples described herein, an SCM device to implement (at least in part) the SCM read cache 150 may be implemented in any one of a plurality of different forms, such as, for example, a 3D XPoint™ chip (or device), a 3D XPoint™ DIMM, a Phase Change Memory (PCM) device (such as Phase-Change random-access memory (RAM) device), a Magnetic RAM (MRAM) device (such as a Spin-Torque-Transfer (STT) RAM device), a Resistive RAM (RRAM) device, a memristor device, or the like, or a combination thereof. In some examples, an SCM device may implement block-based access. In other examples, an SCM device may implement memory-based semantics for data access. In such examples, SCM-based DIMMs may be used to implement SCM read cache in examples described herein. In examples described herein, SCM read cache 150 may be implemented (at least in part) by an SCM device having no FTL and having lower latency than an SSD comprising an FTL, such as a SAS SSD, for example. In some examples, one or more storage devices of backend storage 160 may communicate using a protocol consistent with NVMe™.

In some examples, the IO request latency of an SCM device (or card) may depend on the cumulative amount of data being read from and written to the SCM device (i.e., via IO requests) in a given time period. As such, in examples described herein, IO request latency may be used as a proxy for (or other indication of) the cumulative amount of data being read from and written to the SCM device (i.e., via IO requests) in a given time period. In examples described herein, "IO request latency" (which may be referred to as "latency" herein) may refer to the time it takes an SCM device to complete a given IO request. In some examples, this relationship between the cumulative amount of data read from and written to an SCM device and IO request latency may be relatively stable for a given type of SCM device. In some examples, performance data approximating this relationship may be determined for a given type of SCM device (e.g., via empirical testing of that type of SCM device).

For example, FIG. 2A is a graph 200 of example SCM performance data 202 for SCM read cache 150 of FIG. 1 (i.e., for the type of SCM device used to implement SCM read cache 150). In graph 200, the vertical axis represents IO request latency (e.g., in microseconds), the horizontal axis represents cumulative amounts of data (e.g., in megabytes), and example SCM performance data 202 is illustrated as a curve showing a relationship between IO request latency of SCM read cache 150 (i.e., the type of SCM device implementing SCM read cache 150) and the cumulative amount of data read from and written to the SCM read cache 150 in a given time period (e.g., of a certain length, such as 100 milliseconds). For example, SCM performance data 202 may specify an estimate of the expected IO request latency of SCM read cache 150 as a function of the cumulative amount of data read from and written to the SCM read cache 150 in a given time period. In such examples, the expected IO request latency of SCM read cache 150 may be considered to be correlated with (e.g., dependent upon) the cumulative amount of data read from and written to the SCM read cache 150 in a given time period.

In some examples, SCM performance data 202 may also be represented as a set of points on the curve of SCM performance data 202 illustrated in FIG. 2A. For example, FIG. 2B is a table 250 of example SCM performance data 202 corresponding to the example graph 200 of FIG. 2A. In such examples, the SCM performance data may be represented as respective data pairs, each including an IO request latency value 252 and a corresponding cumulative data amount value 254. Although examples are described herein in relation to SCM performance data 202 as a curve and as data pairs, other examples may utilize ranges rather than only discrete values in various ways.

As noted above, an SCM device may exhibit a relatively low IO request latency when the cumulative amount of data being read from and written to the SCM device in a given time period does not exceed a data rate threshold. However, the SCM device may exhibit much higher IO request latencies when the data rate threshold is exceeded. In the example of FIGS. 1 and 2A, the data rate threshold may be represented as a certain value for the cumulative data amount in a given time period. For example, in the example of FIG. 2A, the data rate threshold for SCM read cache 150 may be represented as threshold data amount 212 shown in graph 200 (e.g., 400 MB in a given 100 ms time period, although this may be different in other examples).

Since the expected IO request latency for SCM read cache 150 may depend upon the cumulative data amount (per time period), as described above, an IO request latency threshold 210 for SCM read cache 150 may be determined based on an estimated IO request latency value corresponding to the threshold data amount 212 in performance data 202. In the example of FIG. 2A, a latency threshold 210 for SCM read cache 150 may be determined based on the estimated IO request latency value (e.g., 31 microseconds) at an (actual or approximate) intersection point 214 between threshold data amount 212 (e.g., 400 MB) and performance data 202. In such examples, latency threshold 210 may be used as a proxy for the data rate threshold, and a determination that a representative IO request latency (e.g., average IO request latency) is above the latency threshold 210 may be treated as an indication that the data rate threshold is being approached or exceeded for SCM read cache 150. In some examples, the data rate threshold may be expressed or represented as an amount of data (i.e., representing the data rate threshold as that amount of data in a given time period), or in any other suitable terms (e.g., as a rate represented as an amount of data per unit of time).

Referring again to FIG. 1, in some examples, controllers 102 and 104 may be similar or identical (e.g., in at least one of hardware and machine-readable executable instructions stored thereon). For example, controller 104 may comprise at least one processing resource 107 that is similar or identical to the at least one processing resource 105 of controller 102, memory 190 similar or identical to memory 140 of controller 102, and machine-readable storage medium 117 similar or identical to machine-readable storage medium 190 controller 102. In such examples, memory 190 may implement main cache 192 similar or identical to main cache 142 of controller 102, and storage medium 117 may comprise instructions similar or identical to instructions 121 and executable by processing resource 107 to implement the functionalities described herein in relation to instructions 121.

In some examples, each of controllers 102 and 104 may access (e.g., read from and write to) SCM read cache 150. For example, the SCM device implementing SCM read cache 150 may be dual-ported, and each of controllers 102 and 104 may access SCM read cache 150 using a respective one of the ports of the dual-ported SCM device. For example, such a dual-ported SCM read cache 150 may receive and process IO requests from each of controllers 102 and 104. In such examples, controller 104 may utilize SCM read cache 150 as described herein in relation to controller 102. For example, controller 104 may utilize the SCM read cache 150 to extend the capacity of main cache 192 for servicing read requests, and may flush or destage data from main cache 192 into SCM read cache 150 such that the data may subsequently be read back into main cache 190 from SCM read cache 150. In such examples, neither of controllers 102 and 104 may be able to directly monitor the amount of data that the other controller reads from and writes to SCM read cache 150 in a given time period, and as such, neither of controllers 102 and 104 may be able to directly monitor the cumulative amount of data that controllers 102 and 104 read from and write to SCM read cache 150 in a given time period. In such examples, it may be difficult for either of controllers 102 and 104 to determine whether the cumulative amount of data in a time period is high enough that the data rate threshold is being approached or exceeded and that one or both of the controllers should reduce usage of the SCM read cache (e.g., by bypassing the SCM read cache and/or dropping destage requests).

However, each of the controllers utilizing SCM read cache 150 will experience approximately the same IO request latencies in the same time period, since those IO request latencies are dependent upon the cumulative amount of data being read from and/or written to the SCM read cache 150 by all of the controllers. As noted above, IO request latency may be used as a proxy for (or other indication of) the cumulative amount of data being read from and written to the SCM device (i.e., via IO requests) in a given time period, as noted above, and in examples described herein, each of controllers 102 and 104 may determine the IO request latency of the IO requests that it sends to SCM read cache 150. As such, in examples described herein, each individual controller may measure the IO request latencies that it observes, and use those IO request latencies to determine whether it should reduce its usage of SCM read cache 150 by bypassing SCM read cache 150 and/or dropping destage requests, as described herein, even though a given controller may not be able to measure the cumulative amount of data read from and written to SCM read cache 150 by all controllers for a given time period.

Figure 3:
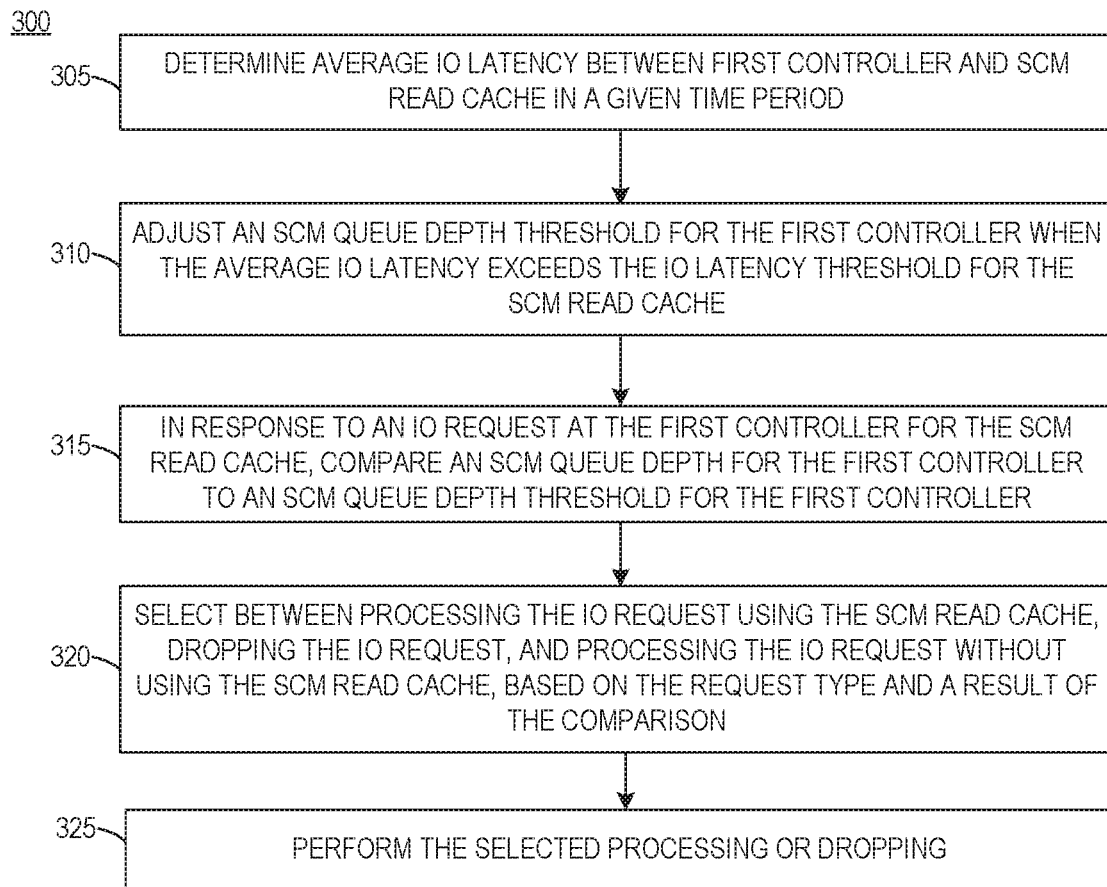
FIG. 3 is a flowchart of an example method that includes selecting whether to use an SCM read cache based on an SCM queue depth threshold.
Figure 4:
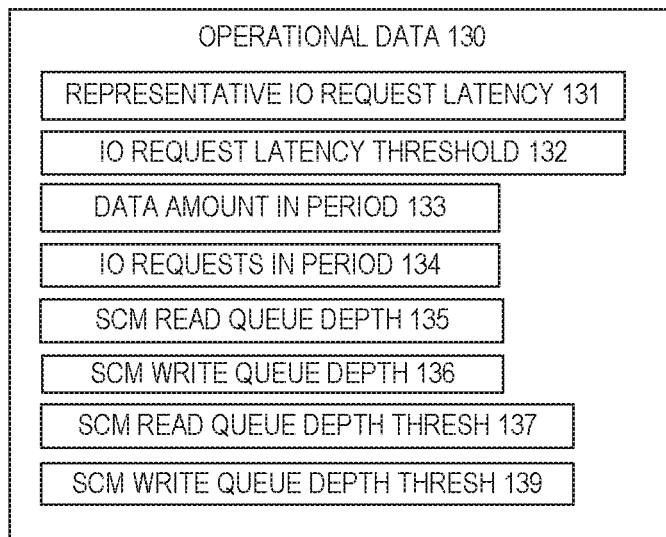
FIG. 4 is a block diagram of example operational data that may be associated with an SCM read cache.

Examples related to controlling usage of SCM read cache 150 based on observed IO request latencies are described below in relation to FIGS. 1, 3, and 4. FIG. 3 is a flowchart of an example method 300 that includes selecting whether to use an SCM read cache based on an SCM queue depth threshold. Although execution of method 300 is described below with reference to computing device 100 of FIG. 1, other computing devices suitable for the execution of method 300 may be utilized. Additionally, implementation of method 300 is not limited to such examples. Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. FIG. 4 is a block diagram of example operational data 130 that may be associated with SCM read cache 150. In some examples, operational data 130 of controller 102 may comprise some or all of the data 131-137 and 139 illustrated in the example of operational data 130 in FIG. 4.

Referring to FIGS. 1, 3, and 4, at 305 of method 300, instructions 122 of controller 102 (e.g., when executed by processing resource 105) may determine a representative IO request latency 131 (i.e., a representative IO request latency value 131) between controller 102 and SCM read cache 150 during a given time period in which controller 102 and controller 104 of storage system 101 are both sending IO requests to SCM read cache 150. In some examples, instructions 122 may determine this representative IO request latency 131 based on the respective latencies of IO requests completed by SCM read cache 150 for controller 102 in the given time period. For example, instructions 122 may determine the representative IO request latency 131 based on accumulating the respective IO request latencies of IO requests completed by SCM read cache 150 for controller 102 in the given time period, and determining an average IO request latency as the representative IO request latency 131 (e.g., by dividing the total of the accumulated IO request latencies by the number of IO requests completed for controller 102 in the given time period), as described in more detail below in relation to FIG. 5A. In other examples, instructions 122 may determine any other suitable value for the representative IO request latency 131 based on the respective IO request latencies of IO requests completed by SCM read cache 150 for controller 102 in the given time period.

Instructions 122 may determine the IO request latency for each IO request issued from controller 102 and completed by SCM read cache 150 in any suitable manner. For example, instructions 122 may record a first time (e.g., "t1") at which a given IO request is issued from a driver for SCM read cache 150 (e.g., an NVMe™ driver) to a submission queue of the SCM device implementing SCM read cache 150, and may also record a second time (e.g., "t2") at which an indication that the given IO request is completed is received by the driver for SCM read cache 150 (e.g., the NVMe™ driver) from a completion queue of the SCM device implementing SCM read cache 150. In such examples, instructions 122 may determine the IO request latency for the given IO request by subtracting the first time from the second time (e.g., IO request latency=t2−t1). In such examples, instructions 122 may determine the IO request latency of each IO request is issued controller 102 to SCM read cache 150. In some examples, instructions 122 may also accumulate a total IO request latency for a given time period, by adding together all of the individual IO request latencies for each IO request that was issued by controller 102 and completed by the SCM read cache in the given time period, as described below.

At 310, instructions 124 (e.g., when executed by processing resource 105) may adjust at least one SCM queue depth threshold for controller 102 (e.g., in operational data 130), in response to a determination that the determined representative IO request latency 131 exceeds an IO request latency threshold 132 (e.g., of operational data 130) for SCM read cache 150. For example, instructions 124 may determine whether representative IO request latency 131 exceeds IO request latency threshold 132. Instructions 124 may decrease at least one of the SCM queue depth threshold(s) of controller 102 based on a determination that the representative IO request latency 131 exceeds IO request latency threshold 132. Instructions 124 may increase at least one of the SCM queue depth threshold(s) of controller 102 based on a determination that representative IO request latency 131 does not exceed (i.e., is less than or equal to) threshold 132, as described in more detail below in relation to FIGS. 5A-5C.

In examples described herein, a "queue depth" for a controller at a given time may be a number of IO requests (e.g., of a particular type) that are outstanding at the given time (e.g., issued by the controller and not yet completed or reported as completed to the controller at the given time). In examples described herein, an "SCM queue depth" for a controller at a given time may be a number of IO requests (e.g., of a particular type) that are outstanding at an SCM read cache (or other SCM device) at the given time (e.g., issued to the SCM read cache by the controller and not yet completed or reported as completed to the controller at the given time). In some examples described herein, an SCM queue depth may refer to an SCM read queue depth or an SCM write queue depth. In such examples, an "SCM read queue depth" for controller at a given time may be a total number of read requests issued by the controller to an SCM read cache (or other SCM device) that are outstanding at the given time (i.e., issued to the SCM read cache by the controller and not yet completed or reported as completed at the given time). In examples described herein, an "SCM write queue depth" for a controller at a given time may be a total number of write requests (e.g., destage requests) issued to an SCM read cache (or other SCM device) by the controller that are outstanding at the given time (i.e., issued to the SCM read cache by the controller and not yet completed or reported as completed at the given time).

In examples described herein, an "SCM queue depth threshold" for a controller may be an adjustable threshold related to (e.g., set for) an SCM queue depth for the controller in relation to an SCM read cache (or other SCM device). In such examples, an SCM queue depth threshold may refer to an SCM read queue depth threshold or an SCM write queue depth threshold, for example. In examples described herein, an "SCM read queue depth threshold" for a controller may be an adjustable threshold related to (e.g., set for) an SCM read queue depth for the controller in relation to an SCM read cache (or other SCM device). An "SCM write queue depth threshold" for a controller may be an adjustable threshold related to (e.g., set for) an SCM write queue depth for the controller in relation to an SCM read cache (or other SCM device).

In some examples, instructions 121 may implement a single SCM queue depth threshold 138 of controller 102 for SCM read cache 150, and instructions 124 may adjust the single SCM queue depth threshold. In other examples, instructions 121 may implement a plurality of SCM queue depth thresholds of controller 102 for SCM read cache 150, such as an SCM read queue depth threshold 137 of controller 102 and an SCM write queue depth threshold 139 of controller 102, each for SCM read cache 150. In such examples, instructions 124 may selectively adjust one of those thresholds at a time (as described in more detail below in relation to FIGS. 5B and 5C). In such examples, instructions 124 may adjust the SCM read and write queue depth thresholds 137 and 139 in a staged manner. In other examples, instructions 124 may adjust the SCM read and write queue depth thresholds 137 and 139 uniformly (e.g., adjust both in the same direction at the same time to maintain them at the same value).

In some examples, the SCM read queue depth threshold 137 of controller 102 for SCM read cache 150 may be a threshold to which a current SCM read queue depth of controller 102 for SCM read cache 150 may be compared in response to a read request 180 to read requested data from SCM read cache 150. In some examples, the SCM write queue depth threshold 139 of controller 102 for SCM read cache may be a threshold to which a current SCM write queue depth of controller 102 for SCM read cache 150 may be compared in response to a destage request 180 to write clean data from main cache 142 to SCM read cache 150. In examples in which there is a single SCM queue depth threshold of controller 102 for SCM read cache 150, a current SCM queue depth of controller 102 (e.g., the SCM read queue depth, the SCM write queue depth, or combination of the two) may be compared to the single SCM queue depth threshold of controller 102 in response to either the above-described read request 180 or destage request 180. In examples described herein, a "current" SCM queue depth of a controller an SCM read cache may be the value of that SCM queue depth (e.g., SCM read queue depth or SCM write queue depth) of the controller at the time that the value (e.g., of outstanding IOs of a particular type to SCM read cache 150) is checked or determined in response to an IO request (which may be a "current" time in examples described herein).

At 315 of method 300, instructions 126 (e.g., when executed by processing resource 105) may receive an IO request 180 of controller 102 for SCM read cache 150. The IO request 180 may be a read request to read requested data from SCM read cache 150 into main cache 142, or a destage request to write data from main cache 142 to SCM read cache 150. In response to the IO request 180, instructions 126 may determine a type of the IO request 180 (e.g., a read request or a destage request) and may compare an SCM queue depth for controller 102 to one of the at least one SCM queue depth threshold for controller 102 (as described in more detail below in relation to FIG. 6).

In examples described herein, the types of IO requests (or IOs) for SCM read cache 150 may include read requests and destage requests. In some examples, read requests may be requests to read certain requested data from SCM read cache 150 based on host IO requests to computing device 100, and destage requests may be destage requests generated by controller 102 (i.e., internally generated by controller 102 and not representing a host write IO, for example). For example, a computing device 100 may receive a read request from a host computing device separate from computing device 100 via one or more computer network(s). In some examples, such a host read request for certain requested data may trigger controller 102 to request 180 that instructions 126 read some or all of the requested data from SCM read cache 150 (e.g., when the requested data is not present in main cache 142 but is present in SCM read cache 150). In contrast, a destage request 180, in examples described herein, may be internally generated by controller 102 when controller 102 determines that main cache 142 is too full and decides to destage clean data from main cache 142 to SCM read cache 150, for example. In examples described herein, a host may be any suitable computing device able to communicate with computing device 100 via one or more computer network(s). In examples described herein, a computer network may include, for example, a local area network (LAN), a virtual LAN (VLAN), a wireless local area network (WLAN), a virtual private network (VPN), the Internet, or the like, or a combination thereof.

As noted above, in response to IO request 180, instructions 126 may determine a type of the IO request 180 (e.g., a read request or a destage request) and may compare an SCM queue depth of controller 102 for SCM read cache 150 to one of the at least one SCM queue depth threshold of controller 102 (as described in more detail below in relation to FIG. 6). In some examples, comparing an SCM queue depth of controller 102 to SCM queue depth threshold(s) of controller 102 may include comparing a current number of IO requests (e.g., of a particular type) issued from controller 102 that are outstanding at SCM read cache 150 to one of the SCM queue depth threshold(s) of controller 102.

In some examples, operational data 130 of controller 102 may include an SCM read queue depth 135 of controller 102 for SCM read cache 150 (e.g., a number of outstanding read requests issued from controller 102 to SCM read cache 150), and an SCM write queue depth 136 of controller 102 for SCM read cache 150 (e.g., a number of outstanding write requests issued from controller 102 to SCM read cache 150). In such examples, in response to IO request 180, instructions 126 may determine the type of IO request 180. When IO request 180 is a read request, then instructions 126 may compare the current SCM read queue depth 135 of controller 102 to SCM read queue depth threshold 137 of controller 102, in response to IO request 180. When IO request 180 is a destage request, instructions 126 may compare the current SCM write queue depth 136 of controller 102 to SCM write queue depth threshold 139 of controller 102, in response to IO request 180.

Returning to FIG. 3, at 320, instructions 126 may (e.g., when executed by processing resource 105), based on a type of the IO request 180 and a result of the comparison, select between (1) processing IO request 180 using SCM read cache 150, (2) dropping IO request 180, and (3) processing IO request 180 without using SCM read cache 150. In response to the selection, instructions 126 may (at 325 of method 300) perform the selected processing or dropping of IO request 180 (as described in more detail below in relation to FIG. 6). For example, based on (i) a determination that IO request 180 is a request to destage data to SCM read cache 150 and (ii) the result of the comparison indicating that the SCM write queue depth 136 of controller 102 is greater than SCM write queue depth threshold 139 of controller 102, instructions 126 may select to drop IO request 180. In response to selecting to drop IO request 180, instructions 126 may perform the selection (at 325 of method 300), including dropping IO request 180 without writing the data (i.e., specified by the destage request) to SCM read cache 150 or to backend storage 160.

In examples described herein, a request to destage data to SCM read cache 150 is a request to destage clean data from main cache 142 to SCM read cache 150. In examples described herein, "clean" data in main cache 142 is data for which there is presently a copy in backend storage 160 (e.g., because it has not been changed in main cache 142 since it was brought into main cache 142 from backend storage 160 or because it has not been changed since it was flushed to backend storage 160). For such clean data in main cache 142, a copy of the clean data exists in backend storage 160 at the time of the destage request. In contrast, "dirty" data in a cache is data that is not present in backend storage because, for example, the data in the cache is new or modified and has not been flushed to the backend storage with the changes. In such examples, dropping a request to flush dirty data might lead to data loss (e.g., loss of the changes to the data). However, in examples described herein, the destage request relates to destaging clean data from main cache 142 to SCM read cache 150 and, as noted above, the clean data is already present in backend storage 160, so dropping the destage request would not likely result in any data loss.

In examples described herein, a destage request may be received when controller 102 has determined that main cache 142 is too full and space needs to be freed in main cache 142 (e.g., by destaging the least recently used data, or the like). In such examples, the clean data may be destaged from main cache 142 to SCM read cache 150 where it may be held for later reading from SCM read cache 150 with lower latency than if it were to read the data from backend storage 160 at the later time. While destaging to SCM read cache 150 may save time on a later re-read of the data, the potential future savings may not be worth the additional load on the SCM read cache 150 to write to the SCM read cache 150 to perform the destage. For example, when the SCM read cache 150 has recently been processing data at, above, or near a data rate threshold for the SCM read cache 150, the additional load of processing the destage request may exceed the data rate threshold and cause later IOs to execute with much higher latency than if the data rate threshold were not exceeded, for example. As such, it may be preferable to drop a destage request in some circumstances.

As such, in examples described herein, instructions 124 may adjust the SCM write queue depth threshold 139 of controller 102 for SCM read cache 150 based on the representative IO request latency 131 between controller 102 and SCM read cache 150, as described above in relation to instructions 122, as the representative IO request latency 131 may serve as a proxy for the cumulative amount of data read from and written to SCM read cache 150 by controllers 102 and 104. In such examples, instructions 126 may select to drop a destage request when the current SCM write queue depth 136 of controller 102 for SCM read cache 150 is greater than the current SCM write queue depth threshold 139 of controller 102 for SCM read cache 150, in order to avoid overloading SCM read cache 150 and potentially causing much higher latency for later IO requests. In such examples, when a destage request is dropped, the clean data that was to be destaged from main cache 142 may be freed in main cache 142 without being written elsewhere (e.g., to SCM read cache 150 or backend storage 160).

Returning to 320 of method 300 of FIG. 3, instructions 126 may make an alternative selection when different criteria are met. For example, based on (i) a determination that IO request 180 is a read request for requested data and (ii) the result of the comparison indicating that the SCM read queue depth 135 of controller 102 is greater than the SCM read queue depth threshold 137 of controller 102, instructions 126 may select to process IO request 180 without using SCM read cache 150. In response, instructions 126 may perform the selection (at 325 of method 300), including bypassing SCM read cache 150 and reading the requested data into main cache 142 of controller 102 from other storage (e.g., at least one of backend storage 160 of storage system 101 or a remote computing device). In other examples, instructions 126 make further determinations (e.g., based on location and utilization of other storage from which the requested data would be read) and decide whether to bypass SCM read cache 150 based in part on those further determination as well.

In such examples, reading from SCM read cache 150 may generally have lower latency than reading from backend storage 160 (as described above), but when the data rate experienced by SCM read cache 150 exceeds the data rate threshold, then subsequent IOs to SCM read cache 150 may experience significantly higher latencies, as described above. As such, instructions 126 may bypass SCM read cache 150 and read directly from backend storage 160 when a current SCM read queue depth threshold 137 of controller 102 for SCM read cache 150 is exceeded by the current SCM read queue depth 135 of controller 102 for SCM read cache 150, where the SCM read queue depth threshold 137 is adjusted based on the representative IO request latency 131, as described above. In such examples, controlling the SCM read queue depth threshold and selectively bypassing the SCM read cache 150 based on that threshold may beneficially maintain the data rate experienced by SCM read cache 150 below the data rate threshold.

Returning to 320 of FIG. 3, instructions 126 may make yet another selection when different criteria are met. For example, based on based on (i) a determination that IO request 180 is a request to destage data to SCM read cache 150 and (ii) the result of the comparison indicating that the SCM write queue depth 160 of controller 102 for SCM read cache 150 is not greater than the SCM write queue depth threshold 139 of controller 102, instructions 126 may select to process IO request 180 using SCM read cache 150. In response to the selection, instructions 126 (at 325 of method 300) may destage (e.g., write) the data specified by the destage request 180 from main cache 142 to SCM read cache 150.

In some examples, instructions 126 may make yet another selection when different criteria are met. For example, based on (i) a determination that IO request 180 is a read request to read requested data from SCM read cache 150 and (ii) the result of the comparison indicating that the SCM read queue depth 135 of controller 102 for SCM read cache 150 is not greater than the SCM read queue depth threshold 137 of controller 102 for SCM read cache 150, instructions 126 may select to process IO request 180 using SCM read cache 150. Based on the selection, instructions 126 (at 325 of method 300) may read the requested data from SMC read cache 150 into main cache 142.

Figure 5A:
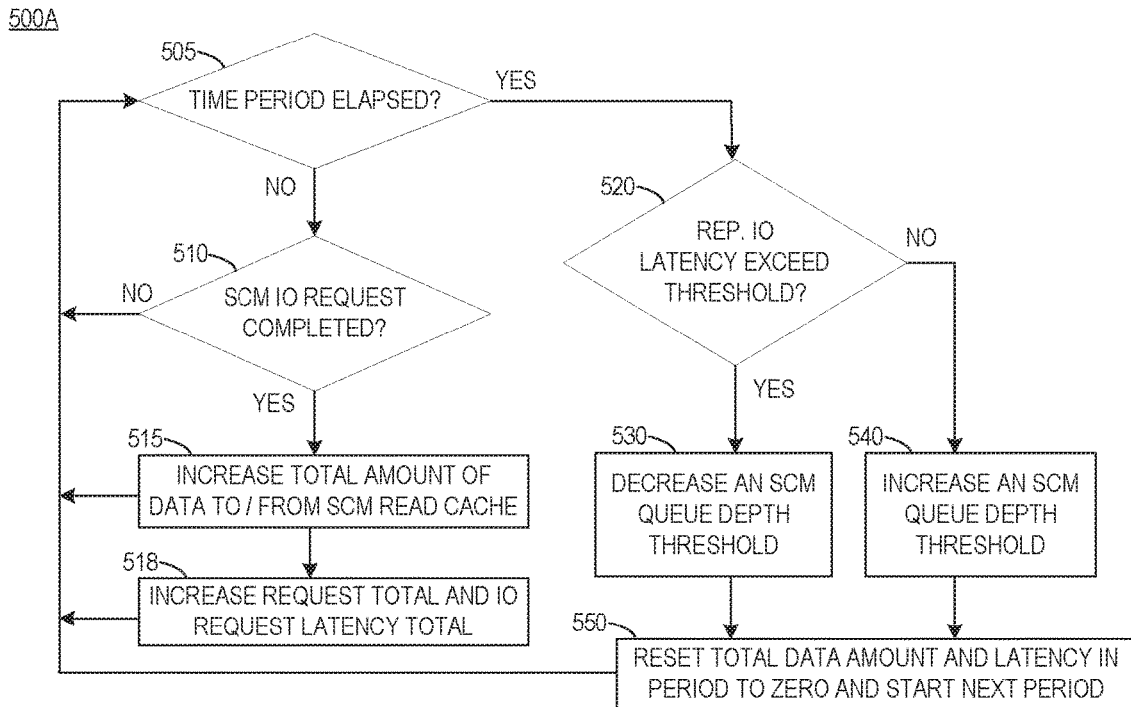
FIG. 5A is a flowchart of an example method that includes adjusting an SCM queue depth threshold based on a representative input/output (IO) latency and an IO request latency threshold.
Figure 5B:
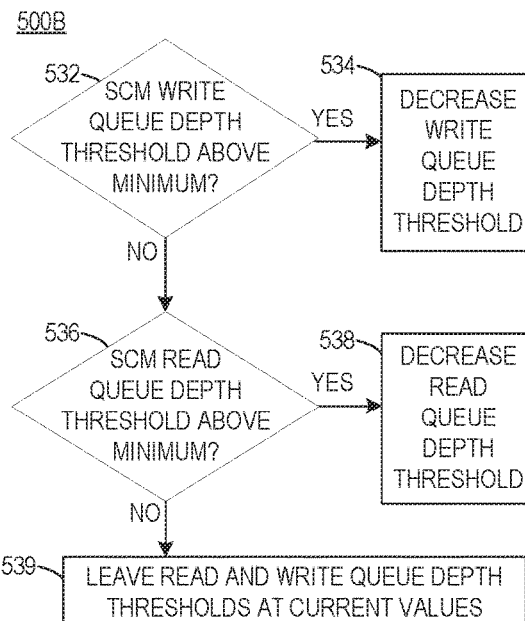
FIG. 5B is a flowchart of an example method that includes selectively decreasing one of an SCM write queue depth threshold and an SCM read queue depth threshold for a controller.
Figure 5C:
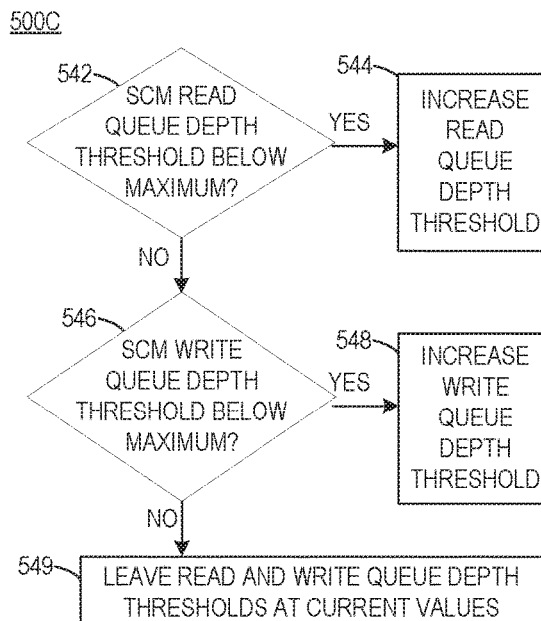
FIG. 5C is a flowchart of an example method that includes selectively increasing one of an SCM write queue depth threshold and an SCM read queue depth threshold for a controller.

Examples described above in relation to method 300 of FIG. 3 will now be described below in more detail in relation to the examples of FIGS. 5A, 5B, and 5C. FIG. 5A is a flowchart of an example method 500A that includes adjusting an SCM queue depth threshold based on a representative IO request latency and an IO request latency threshold. FIG. 5B is a flowchart of an example method 500B that includes selectively decreasing one of an SCM write queue depth threshold and an SCM read queue depth threshold of a controller. FIG. 5C is a flowchart of an example method 500C that includes selectively increasing one of an SCM write queue depth threshold and an SCM read queue depth threshold of a controller. Although execution of methods 500A, 500B, and 500C are described below with reference to computing device 100 of FIG. 1, other computing devices suitable for the execution of these methods may be utilized. Additionally, implementation of these methods is not limited to such examples. Although the flowcharts of FIGS. 5A-5C each show a specific order of performance of certain functionalities, the methods are not limited to that order. For example, the functionalities shown in succession in the flowcharts may be performed in a different order, may be executed concurrently or with partial concurrence, or a combination thereof.

As described above in relation to FIGS. 1 and 3, instructions 122 may determine a representative IO request latency 131 between controller 102 and SCM read cache 150 during a given time period (at 305 of method 300), and instructions 124 may adjust at least one SCM queue depth threshold of controller 102 (at 310 of method 300), in response to a determination that the representative IO request latency 131 exceeds an IO request latency threshold 132 of controller 102 for SCM read cache 150. In some examples, these functionalities may be performed periodically by a background process (or thread) implemented, at least in part, by instructions 122 and 124. Functionalities described above in relation to 305 and 310 of FIG. 3 may be described in more detail below in relation to FIGS. 5A-5C.

Referring to FIG. 5A, method 500A may start at 505, where instructions 122 may determine whether a time period has elapsed. For example, a background process (as noted above) may periodically perform determining a representative IO request latency and selectively adjusting SCM queue depth threshold(s). In the example of FIG. 5A, the determination and selective adjustment may be performed at the end of each of a plurality of successive time periods. Such time periods may each be a fixed amount of time such as, for example, around 100 milliseconds (or any other suitable amount of time). In such examples, during each of the time periods (i.e., while the time period has not elapsed), instructions 122 may accumulate the total amount of data read from and written to SCM read cache 150 during the time period by controller 102, the total number of IO requests issued from controller 102 to SCM read cache 150 that were completed during the time period, and the total IO request latency of the IO requests completed by the SCM read cache 150 during the time period. This may be performed by, for example, adding to each of these totals each time an IO request is completed by SCM read cache 150.

For example, at 505 of method 500A of FIG. 5A, if the current time period has not elapsed ("NO" at 505), method 500A may proceed to 510, where instructions 122 may determine whether any outstanding IO request issued by controller 102 to SCM read cache 150 has completed. If SCM read cache 150 has not completed any outstanding IO request from controller 102 ("NO" at 510), then instructions 122 may return to 505 to determine whether the current time period has elapsed.

If SCM read cache 150 has newly completed an outstanding IO request from controller 102 ("YES" at 510), then instructions 122 may increase the total amount of data read from and written to SCM read cache 150 by controller 102 in the current time period based on the size of the completed IO request (i.e., by adding the amount of data read or written by the IO request). For example, at 515, for each IO request from controller 102 that is newly completed by SCM read cache 150 (i.e., not already used to increase the total amount of data), instructions 122 may add the amount of data read and/or written by the completed IO request to a running total amount of data 133 for the current time period. At 518, for each IO request from controller 102 that is newly completed by SCM read cache 150 (i.e., not already used to increase the IO request or latency totals), instructions 122 may (i) increment the running total number 134 of IO requests completed by SCM read cache 150 in the current time period, and (ii) add the IO request latency of the newly completed IO request to a running total IO request latency for the current time period (i.e., the total IO request latency for all such IO requests completed by SCM read cache 150 for controller 102 in the current time period). In some examples, each of the total amount of data 133, the total number 134 of IO requests, and the total IO request latency may be stored amount operational data 130 of controller 102 (see, e.g., FIG. 4). After appropriately increasing the total amount of data 133, the total number 134 of IO requests, and the total IO request latency at 515 and 518, instructions 122 may return to 505 to determine whether the current time period has elapsed. In such examples, by repeatedly performing 510, 515, and 518, while the time period has not elapsed (at 505), instructions 122 may accumulate the total amount of data 133 read from and written SCM read cache 150 via IO requests issued by controller 102 during the time period, accumulate the total IO request latency for IO requests completed by SCM read cache 150 during the time period, and accumulate the total number 134 of the IO requests of controller 102 completed by SCM read cache 150 during the time period. Instructions 122 may determine the IO request latency for each completed IO request as described above. In some examples, controller 102 may be executing multiple different threads that may be reading from and writing to SCM read cache 150 (e.g., one or more read threads and one destage thread). In such examples, instructions 122 may accumulate the total amounts of data, latency, and number of IO requests, as described above, for all of those threads (e.g., by basing the accumulated totals on each IO request completed by SCM read cache 150).

At 505, when the current time period has elapsed (e.g., at the end of the current 100 ms time period) ("YES" at 505), method 500A may proceed to 520 where instructions 124 may determine whether the IO request latency threshold 132 of controller 102 for SCM read cache 150 is exceeded in the time period, based on the accumulated total latency in the time period and the accumulated total number of completed IO requests in the time period. For example, instructions 122 may determine a representative IO request latency 131, such as an average IO request latency 131 based on a result of dividing the accumulated total latency in the time period by the accumulated total number of completed IO requests in the time period. In such examples, instructions 124 may determine, at 520, whether the representative IO request latency 131 exceeds the IO request latency threshold 132 of controller 102.

Based on the determination at 520, instructions 124 may adjust at least one SCM queue depth threshold of controller 102 for SCM read cache 150. For example, if instructions 124 determine that representative IO request latency 131 for the time period exceeds the IO request latency threshold 132 of controller 102 ("YES" at 520), then in response, at 530, instructions 124 may decrease at least one SCM queue depth threshold of controller 102 for SCM read cache 150. Method 500A may then proceed to 550, where instructions 122 may (i) reset the total amount of data 133 for the time period to zero (in preparation for the next time period), (ii) reset the total number of IO requests completed in the time period to zero (in preparation for the next time period), (iii) reset the total IO request latency for the time period to zero (in preparation for the next time period), (iv) start the next time period, (v) and (at 505) begin to perform method 500A again for the next time period (e.g., the next 100 ms time period).

In other examples, if instructions 124 determine that representative IO request latency 131 for the time period does not exceed the IO request latency threshold 132 of controller 102 ("NO" at 520), then in response, at 540, instructions 124 may increase at least one SCM queue depth threshold of controller 102 for SCM read cache 150. Method 500A may then proceed to 550, where instructions 122 may perform the functionalities described above in relation to 550. Although examples are described herein in the context of a 100 ms time period, other suitable time periods may be utilized. In the examples described herein, there may be a tradeoff between having shorter intervals (e.g., 10 ms, which may provide more frequent feedback on the recently observed rate of data transfer but may also consume more resources) and having longer intervals (e.g., 1 second, which may consume fewer resources, but may also provide less frequent feedback and be more susceptible to distortion by temporary bursts of data transfers). While 100 ms may be a suitable compromise between these competing concerns in some examples, in other examples, other time periods may be more suitable, particularly as the performance capabilities of computing device resources increase.

Referring again to FIG. 5A, in examples in which there is one SCM queue depth threshold of controller 102 for SCM read cache 150, instructions 124 may increase that one SCM queue depth threshold at 540 of method 500A, and may decrease that one SCM queue depth threshold at 530 of method 500A. In other examples in which there are multiple SCM queue depth thresholds of controller 102 for SCM read cache 150, and those multiple SCM queue depth thresholds are treated the same by instructions 124 (e.g., an SCM read queue depth threshold and an SCM write queue depth threshold), instructions 124 may increase both such SCM queue depth thresholds at 540 of method 500A, and may decrease both such SCM queue depth thresholds at 530 of method 500A. In other examples, instructions 121 may implement an SCM read queue depth threshold 137 and a different SCM write queue depth threshold 139, and instructions 124 may adjust them differently. In some examples, instructions 124 may decrease either the SCM read queue depth threshold 137 or the SCM write queue depth threshold 139 (but not both) at 530 in some examples, and instructions 124 may increase either the SCM read queue depth threshold 137 or the SCM write queue depth threshold 139 (but not both) at 540, in some examples.

In some examples, instructions 124 may adjust SCM read queue depth threshold 137 and SCM write queue depth threshold 139 differently, and in a staged manner, as described below in relation to FIGS. 5B and 5C. For example, referring to FIG. 5B, method 500B may be an example method to implement block 530 of method 500A (i.e., decreasing an SCM queue depth threshold) in which an SCM read queue depth threshold and an SCM write queue depth threshold are adjusted in a staged manner. For example, based on instructions 124 determining that representative IO request latency 131 exceeds IO request latency threshold 132 of controller 102 for SCM read cache 150 ("YES" at 520), instructions 124 may proceed to 532 of method 500B, where instructions 124 may determine whether the SCM write queue depth threshold 139 is above a first minimum value (e.g., zero, or another suitable value). If so ("YES" at 532), then at 534 instructions 124 may decrease SCM write queue depth threshold 139, and then proceed to 550 of method 500A (of FIG. 5A). If not ("NO" at 532; i.e., SCM write queue depth threshold 139 has the first minimum value), then at 536 instructions 124 may determine whether SCM read queue depth threshold 137 is above a second minimum value (e.g., 10% of a default or maximum value for the SCM read queue depth threshold). If so ("YES" at 536), then instructions 124 may decrease SCM read queue depth threshold 137 at 538 and then proceed to 550 of method 500A (of FIG. 5A). When SCM read queue depth threshold 536 also has the first minimum value ("NO" at 536), then instructions 124 may decrease neither SCM write queue depth threshold 139 nor SCM read queue depth threshold 137 at 539, and then proceed to 550 of method 500A (of FIG. 5A).

In the example of FIG. 5B, when decreasing different SCM queue depth thresholds in a staged manner, instructions 124 may first decrease SCM write queue depth threshold 139 until a minimum value is reached (e.g., 0, or another suitable minimum value), and begin to decrease SCM read queue depth threshold 137 only after SCM write queue depth threshold 139 has reached the minimum value, and then cease decreasing either of SCM queue depth thresholds 137 and 139 if they both reach their respective minimum values (which may be the same or different). In this manner, examples described herein may prioritize reads from the SCM read cache 150 over writes, such as destage operations to write clean data from main cache 142 to SCM read cache 150. By adjusting the SCM queue depth thresholds in this manner, destage operations may be dropped more aggressively than SCM read cache 150 is bypassed for read operations. This may be beneficial in some examples because, for example, a present read operation will realize the benefit of the lower latency read from the SCM read cache 150 (over a read from backend storage 160) immediately, while destage operations actually incur the present cost of writing to the SCM read cache 150 to provide the possibility of enabling a lower-latency read from SCM read cache 150 at a later time. As such, it may be beneficial to drop writes more aggressively than bypassing SCM read cache 150 for reads.

In examples described herein, an SCM queue depth threshold may be increased or decreased by any suitable amount, such as a fixed amount, a fixed proportional (e.g., 10% of the current value of SCM queue depth threshold), or any other suitable fixed or variable amount. In some examples, an SCM queue depth threshold of controller 102 may be increased or decreased by an amount that is based on the proportion of the cumulative amount of data read from and written to SCM read cache 150 by all controllers (e.g., controllers 102 and 104) in a time period that is read and written by controller 102 in the time period. In some examples, a defined default adjustment amount may be set (e.g., 10% of the current value of the SCM queue depth threshold being adjusted), and an SCM queue depth threshold of controller 102 may be adjusted by a proportion of that defined adjustment amount based on the proportion of the cumulative amount of data read from and written to SCM read cache 150 by all controllers in a time period that is read and written by controller 102 in the time period. For example, where controller 102 is responsible for reading and writing ¼ of the cumulative amount of data in a given time period, then instructions 124 may adjust an SCM queue depth threshold by ¼ of 10% or 2.5% of the current value of the an SCM queue depth threshold of controller 102.

As noted above, in examples described herein, IO request latency may be used as a proxy for (or other indication of) the cumulative amount of data being read from and written to the SCM device (i.e., via IO requests) in a given time period. A controller, such as controller 102, is also able to determine the total amount of data 133 read from and written to SCM read cache 150 in the given time period, as described above. In such examples, controller 102 may use IO request latency and its total amount of data 133 to determine the proportion of the cumulative amount of data that is attributable to controller 102.

An example of such a determination is described below in relation to FIGS. 2B and 2C, where FIG. 2C is a graph 260 of example SCM device performance data 202 of FIG. 2A and illustrates a determined latency 220 and estimated data amount 224 according to an example. As described above, instructions 122 may determine a representative IO request latency 131 between controller 102 and SCM read cache 150 during a given time period. For example, instructions 122 may determine an average IO request latency of 42 microseconds to be the representative IO request latency 131 for controller 102 in the given time period. This determined average IO request latency 131 is shown in graph 260 of FIG. 2C as a horizontal line 220. As described above, instructions 122 may also determine a total amount of data 133 read from and written to SCM read cache 150 by controller 102 during the given time period. For example, instructions 122 may determine the total amount of data 133 for the given time period to be 160 MB. This determined amount of data is shown in graph 260 of FIG. 2C as a vertical line 222.

As shown in FIG. 2C, the amount of data 222 read from and written to SCM read cache 150 by controller 102 in the given time period (e.g., 160 MB) is likely not large enough on its own to cause the IO request latency in the given time period to rise all the way to the determined IO request latency 220 of 42 microseconds, in this example. Rather, if the 160 MB were all the data read from and written to SCM read cache 150 in the given time period, an IO request latency of approximately 16 microseconds may be expected based on the example performance data 202 of graph 206 (e.g., based on where the determined data amount 222 intersects with the performance data 202). As such, other controller(s) are likely also reading from and/or writing to SCM read cache 150 in the given time period (e.g., controller 104).

In some examples, instructions 124 may determine an estimated cumulative amount of data read from and written to SCM read cache 150 by all of the controllers (e.g., controllers 102 and 104), during the given time period, based on the determined representative IO request latency 131 for the given time period and performance data 202 for SCM read cache 150. For example, instructions 124 may determine an amount of data that corresponds to the determined representative IO request latency 131 in performance data 202 for SCM read cache 150, and determine that amount of data to be an estimated cumulative amount of data 224 read from and written to SCM read cache 150 by all controllers (e.g., controllers 102 and 104) in the given time period.

In such examples, instructions 124 may determine (e.g., locate) an amount of data in performance data 202 based on the value of the determined representative IO request latency 131 for a given time period. For example, when performance data 202 is expressed as pairs of discrete latency and data amount values (as shown in the table of FIG. 2B, for example), then instructions 124 may find a latency value in performance data 202 that is nearest to the value of representative IO request latency 131 for the given time period, and determine the amount of data in performance data 202 that corresponds to that nearest latency value (e.g., paired with that latency value). Instructions 124 may then consider the amount of data corresponding to the nearest latency value in performance data 202 to be an estimated cumulative amount of data 224 for the given time period. In other examples, the estimated cumulative amount of data may be determined from the representative IO request latency 131 and performance data 202 in other suitable manners. For example, one or both of the latency and data values of performance data 202 may be associated with corresponding ranges (e.g., margins, etc.), or one or both of the latency and data values may be expressed as ranges. In such examples, the instructions may find the range that includes the value of representative IO request latency 131, and determine the amount of data (or range) corresponding to (or paired with) that latency value or range. In such examples, instructions 124 may determine the corresponding amount of data (e.g., value, range, or value in the range, etc.) to be the estimated cumulative amount of data.

Returning to the example described above in relation to FIGS. 2B and 2C, the determined representative IO request latency 131 (e.g., an average IO request latency between controller 102 and SCM read cache 150 for the given time period) may be 42 microseconds, illustrated by line 220 in FIG. 2C. As described above, instructions 124 may determine an amount of data in performance data 202 based on the value of the determined representative IO request latency 131 for the given time period, which may correspond to the data amount 224 (illustrated by a vertical line in graph 260) at the point represented by the intersection 226 of the representative IO request latency 131 (e.g., line 220) and performance data 202 (as illustrated in FIG. 2C). In such examples, the estimated data amount 224 may be approximately 490 MB. While FIG. 2C provides a visual representation for illustrative purposes, the performance data may be represented by a table 250 of discrete values, as shown in FIG. 2B, or the like, as described above. In such examples, instructions 124 may find a latency value 252 in table 250 of performance data 202 that is nearest to the value of representative IO request latency 131 for the given time period.

When representative IO request latency 131 for the given time period is 42 microseconds (as described above), instructions 124 may determine that the nearest latency value 252 in table 250 is 40 microseconds, and may determine 480 MB as the amount of data in performance data 202 that corresponds to (e.g., is paired with) that nearest latency value. In such examples, instructions 124 may thereby determine, based on representative IO request latency 131 and performance data 202, an estimated cumulative amount of data read 224 from and written to SCM read cache 150 in the given time period to be 480 MB.

Using that determined value, instructions 124 may then determine an amount to adjust at least one SCM queue depth threshold of controller 102 based on the total amount of data 133 for controller 102 for the given time period and the estimated cumulative amount of data 224 for the given time period. For example, instructions 124 may determine the amount to adjust the at least one SCM queue depth threshold to be a proportion of a defined adjustment amount (as described above), where the proportion is based on a ratio of the amount of data 133 for controller 102 for the given time period and the estimated cumulative amount of data 224 for the given time period. In the example of FIG. 2B, for example, the amount of data 133 for controller 102 for the given time period is 160 MB and the estimated cumulative amount of data 224 for the given time period is 480, and the ratio of those the amount of data 133 for controller 102 to the estimated cumulative amount of data 224 is 160/480 or ⅓ (that is, controller 102 is responsible for ⅓ of the amount of data read from and written to SCM read cache 150 in the given time period). In such examples, instructions 124 may determine the amount to adjust the at least one SCM queue depth threshold of controller 102 to be a proportion of a defined adjustment amount based on that determined ratio, which in this example may be ⅓ (i.e., the determined ratio) of the defined adjustment amount (10%), which in this example may result in ⅓*10%, or an adjustment amount of about 3.3%.

In such examples, instructions 124 may (e.g., at 530 of method 500A) decrease the current value of an SCM queue depth threshold (e.g., an SCM read queue depth threshold or an SCM write queue depth threshold, see FIG. 5B) of controller 102 by about 3.3%. In this manner, controller 102 may adjust its SCM queue depth threshold(s) based on the proportion of the cumulative amount of data read from and written to SCM read cache 150 in a time period that is attributable to controller 102. As noted above, in some examples, controller 104 may also include instructions 121, and processing resource 107 may execute those instructions 121 to perform functionalities described herein in relation to instructions 121 of controller 102. In such examples, controller 104 may also adjust its SCM queue depth threshold(s) based on the proportion of the cumulative amount of data read from and written to SCM read cache 150 in a time period that is attributable to controller 104. In such examples, with controllers 102 and 104 each decreasing their respective SCM queue depth thresholds based on the proportion of the cumulative amount of data that they are each responsible for, examples described herein may control the load imposed on SCM read cache 150 more fairly between controllers 102 and 104 than if their respective SCM queue depth thresholds were decreased uniformly regardless of the respective loads they place on SCM reach cache 150.

Referring now to FIG. 5C, method 500C may be an example method to implement block 540 of method 500A (i.e., increasing an SCM queue depth threshold) in which SCM read queue depth threshold 137 and SCM write queue depth threshold 139 are adjusted in a staged manner. For example, based on instructions 124 determining that representative IO request latency 131 does not exceed IO request latency threshold 132 of controller 102 for SCM read cache 150 ("NO" at 520), instructions 124 may proceed to 542 of method 500C, where instructions 124 may determine whether SCM read queue depth threshold 137 is below a first maximum value (e.g., a default value for SCM read queue depth threshold 137, such as 100, 500, or any other suitable value). If so ("YES" at 542), instructions 124 may increase SCM read queue depth threshold 137 and then proceed to 550 of method 500A (of FIG. 5A). If not ("NO" at 542; i.e., SCM read queue depth threshold 137 has the first maximum value), instructions 124 may determine, at 546, whether SCM write queue depth threshold 139 is below a second maximum value, which may be the same as or different than the first maximum value (e.g., a default value for SCM write queue depth threshold 139, such as 100, 500, or any other suitable value). If so ("YES" at 546), instructions 124 may increase SCM write queue depth threshold 139 and then proceed to 550 of method 500A (of FIG. 5A). If not ("NO" at 546; i.e., SCM write queue depth threshold 139 has the second maximum value), instructions 124 may determine to increase neither the SCM read queue depth threshold 137 nor the SCM write queue depth threshold 139.

In the example of FIG. 5C, when increasing different SCM queue depth thresholds 137 and 139 in a staged manner, instructions 124 may first increase SCM read queue depth threshold 137 until a first maximum value is reached, and begin to increase SCM write queue depth threshold 139 only after SCM read queue depth threshold 137 has reached the first maximum value, and then cease increasing either of SCM queue depth thresholds 137 and 139 if they both reach their respective maximum values (which may be the same or different). In this manner, examples described herein may prioritize reads from the SCM read cache 150 over writes (e.g., destage operations), at least for reasons similar to those described above in relation to FIG. 3B.

In some examples, instructions 124 may increase an SCM queue depth threshold of controller 102 by a defined increase amount, such as 5%. In such examples, each of controllers 102 and 104 may use the same defined increase amount (e.g., 5%) to increase SCM queue depth threshold (s), as described above in relation to 540 of FIG. 5A and method 500C of FIG. 5C. In other examples, instructions 124 may increase an SCM queue depth threshold of controller 102 by an amount that is based on the proportion of the cumulative amount of data read from and written to SCM read cache 150 by all controllers (e.g., controllers 102 and 104) in a time period that is read and written by controller 102 in the time period, as described above in relation to determination of amounts of decrease SCM queue depth thresholds.

In such examples, instructions 124 may determine an estimated cumulative amount of data 224 read from and written to SCM read cache 150 all controllers (e.g., controllers 102 and 104) during the given time period, based on determined representative IO request latency 131 for the given time period and performance data 202 for SCM read cache 150. In such examples, instructions 124 may determine an amount to increase SCM read queue depth threshold 137 or SCM write queue depth threshold 139 to be a proportion (e.g., ⅓) of a defined adjustment amount (e.g., 10%), the proportion based on a ratio of the total amount of data 133 for controller 102 in the given time period and the estimated cumulative amount of data 224 in the given time period, as described above.

As described above in relation to 315, 320, and 325 of FIG. 3, in response to an IO request 180, instructions 126 may (at 320) select between (1) processing the IO request 180 using SCM read cache 150, (2) dropping the IO request 180, and (3) processing the IO request 180 without using SCM read cache 150, based on a type of the IO request 180 and a result of a comparison (at 315), and may perform (at 325) the selected processing or dropping in response to the selection. In some examples, these functionalities may be performed by an IO process (or thread) (e.g., implemented at least in part by instructions 126) that is different than the above-described background process (or thread) (e.g., implemented at least in part by instructions 122 and 124). The IO process may be, for example, a process to implement adaptive caching of data in computing device 100.

Figure 6:
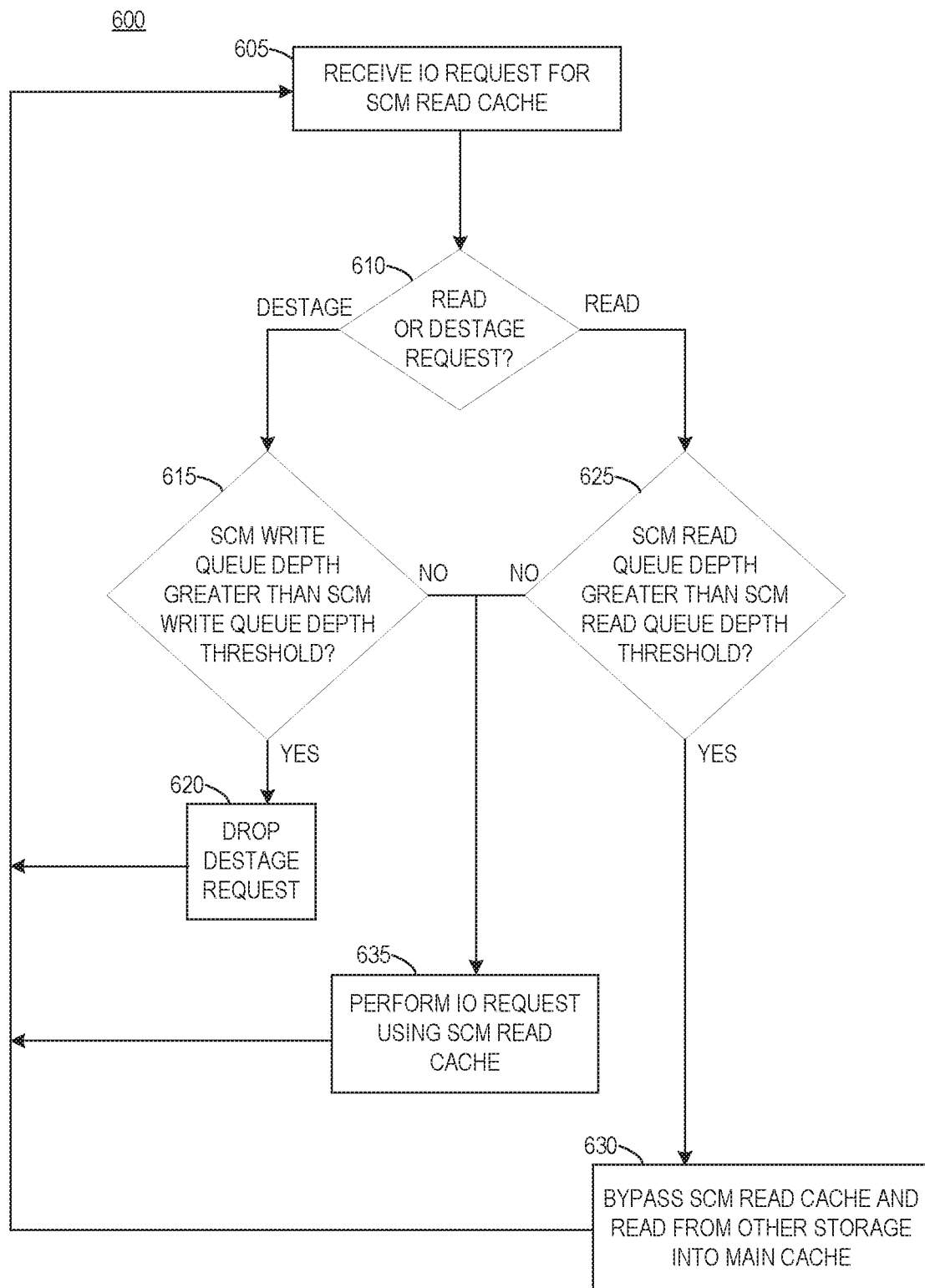
FIG. 6 is a flowchart of an example method that includes selecting whether to process an IO request using an SCM read cache.

Functionalities described above in relation to 315, 320, and 325 of FIG. 3, may be described in more detail below in relation to FIGS. 1 and 6, where FIG. 6 is a flowchart of an example method 600 that includes selecting whether to process an IO request using an SCM read cache. Although execution of method 600 is described below with reference to computing device 100 of FIG. 1, other computing devices suitable for the execution of this method may be utilized. Additionally, implementation of these methods is not limited to such examples. Although the flowchart of FIG. 6 shows a specific order of performance of certain functionalities, the method is not limited to that order. For example, the functionalities shown in succession in the flowchart may be performed in a different order, may be executed concurrently or with partial concurrence, or a combination thereof.

Referring to FIG. 6, method 600 may start at 605, where instructions 126 may receive an IO request 180 for SCM read cache 150. At 610, instructions 126 may determine whether the IO request 180 is a read request or a destage request. In response to a determination that the IO request 180 is a read request for requested data ("READ" at 610), instructions 126 may determine at 625 whether an SCM read queue depth 135 of controller 102 for SCM read cache 150 (e.g., a current number of outstanding read IOs of controller 102 for SCM read cache 150) is greater than an SCM read queue depth threshold 137 of controller 102 for SCM read cache 150. If so ("YES" at 625), then at 630 instructions 126 may bypass SCM read cache 150 and read the requested data from backend storage 160 (or other storage, such as storage device(s) of a remote node or array) into main cache 142 (and without reading the requested data from the SCM read cache 150), as described above, and then proceed to 605 to await a subsequent IO request for SCM read cache 150. In other examples, further determination(s) may be made at 630 before deciding whether to proceed with bypassing SCM read cache 150 and reading the requested data from other storage (e.g., backend storage 160), as described in more detail below. If the SCM read queue depth 135 of controller 102 for SCM read cache 150 (e.g., a current number of outstanding read IOs of controller 102 for SCM read cache 150) is not greater than the SCM read queue depth threshold 137 ("NO" at 625), then at 635, instructions 126 may perform the IO request 180 using SCM read cache 150, which in this example may include reading the requested data (of the read request 180) from SCM read cache 150 into main cache 142 of controller 102. As described above, the read request 180 for requested data may be triggered by a host read request (e.g., a read request from a host computing device separate from computing device 100 for at least the requested data). In some examples, main cache 142 may comprise volatile memory, as described above.

Returning to 610 of method 600, in response to a determination that the IO request 180 is a destage request ("DESTAGE" at 610), instructions 126 may determine at 615 whether an SCM write queue depth 136 of controller 102 (e.g., a current number of outstanding write IOs of controller 102 for SCM read cache 150) is greater than an SCM write queue depth threshold 139 of controller 102 for SCM read cache 150. If so ("YES" at 615), then at 620 instructions 126 may drop the IO request 180 (i.e., the destage request 180), as described above, skip destaging the data from main cache 142 to SCM read cache 150 and then proceed to 605 to await a subsequent IO request for SCM read cache 150. In such examples, instructions 126 may allow the data associated with the destage request to be removed from main cache 142 without destaging the data to SCM read cache 150. If SCM write queue depth 136 is not greater than SCM write queue depth threshold 139 of controller 102 for SCM read cache 150 ("NO" at 615), then at 635, instructions 126 may perform the IO request 180 using SCM read cache 150, which in this example may include destaging data from main cache 142 to SCM read cache 150, including writing the data associated with the destage request to SCM read cache 150, and then proceed to 605 to await a subsequent IO request for SCM read cache 150. As described above, a destage request 180 may be a request, generated internally by computing device 100, to destage clean data from main cache 142 into SCM read cache 150.

In some examples, instructions 126 may maintain the number of outstanding read IOs of controller 102 for SCM read cache 150 as the SCM read queue depth 135 and the number of outstanding write IOs of controller 102 for SCM read cache 150 as the SCM write queue depth 136. In such examples, instructions 126 may maintain these numbers by, for example, increasing the number of outstanding read IOs each time a read IO request of controller 102 is issued to the SCM read cache 150 (e.g., to a device driver for an SCM device implementing the SCM read cache 150), and decreasing that number each time one of the read IO requests of controller 102 to SCM read cache 150 is completed (e.g., reported as being completed). Similarly, instructions 126 may increase the number of outstanding write IOs each time a write IO request of controller 102 is issued to the SCM read cache 150 (e.g., to a device driver for an SCM device implementing the SCM read cache 150), and decreasing that number each time one of the write IO requests of controller 102 to SCM read cache 150 is completed (e.g., reported as being completed). In other examples, instructions 126 may determine these numbers in any other suitable manner. In some examples described herein, comparison of a current SCM queue depth of controller 102 for SCM read cache 150 to a respective SCM queue depth threshold of controller 102 may be triggered by (e.g., performed in response to) receiving an IO request 180 (e.g., a read or destage request) for SCM read cache 150. In such examples, the IO request 180 may be received by the IO process or thread performing method 600 of FIG. 6 (e.g., the process or thread implemented at least in part by instructions 126).

In other examples, the IO process (or thread) itself (e.g., instructions 126) may periodically determine whether main cache 142 is too full (e.g., has too little free space) and determine to trigger destaging of page(s) (e.g., least recently used page(s)) from main cache 142 to SCM read cache 150. In such examples, in response to a determination to destage data from main cache 142 SCM read cache 150, instructions 126 may perform a similar process to that described above in relation to method 600, proceeding from 615. For example, in response to the determination to destage data, instructions 126 may destage the data from main cache 142 to SCM read cache 150 (at 635) when the current SCM write queue depth 136 of controller 102 is not greater than the SCM write queue depth threshold 139 of controller 102. In other examples, in response to the determination to destage data, instructions 126 may skip destaging the data from main cache 142 to SCM read cache 150 (e.g., similar to 620) when the current SCM write queue depth 136 of controller 102 is greater than SCM write queue depth threshold 139 of controller 102.

In some examples, it may be more beneficial to read from SCM read cache 150, rather than from backend storage 160 or a remote node (e.g., another storage array), even when instructions 126 determine that the SCM read queue depth 135 of controller 102 is greater than the SCM read queue depth threshold 137. In such examples, this may depend on various factors related to the storage device(s) that the requested data would be read from if SCM read cache 150 were bypassed. For example, it may be acceptable to bypass SCM read cache 150 when the requested data would then be read from storage device(s) local to the computing device including the SCM read cache 150 (e.g., computing device 100), such as storage device(s) of backend storage 160, when those storage device(s) have relatively low utilization. However, it may be more beneficial to proceed with reading the requested data from SCM read cache 150, even when the SCM read queue depth threshold 137 of controller 102 is exceeded, when, for example, the requested data would otherwise be read from a remote node (e.g., a remote computing device, such as another storage array) or from storage device(s) with relatively high utilization. As such, some examples herein may make further determinations before determining whether to bypass SCM read cache 150 for a read request 180 when the SCM read queue depth threshold 137 of controller 102 is exceeded.

For example, in response to a read request 180 for SCM read cache 150 (e.g., "READ" at 610 of FIG. 6) and a determination that the current SCM read queue depth 135 of controller 102 is greater than an SCM read queue depth threshold 137 of controller 102 ("YES" at 625), instructions 126 may make further determinations (e.g., at 630) before determining whether to (i) bypass SCM read cache 150 and read the requested data into main cache 142 from storage other than SCM read cache 150, or (ii) proceed with reading the requested data from SCM read cache 150 into main cache 142, regardless of the exceeded SCM read queue depth threshold 137. For example, at 630, instructions 126 may make further determinations related to one or more of the location of the other storage from which the requested data would be read if SCM read cache 150 were bypassed, and a current utilization of that other storage. For example, in response to the read request 180 (e.g., "READ" at 610) and the determination that the current number 136 of read IOs outstanding is greater than the SCM read queue depth threshold for SCM read cache 150 ("YES" at 625), at 630, instructions 126 may first determine what other storage device(s) the requested data is to be read from if SCM read cache 150 is bypassed and the location(s) of those other storage device(s). For example, if instructions 126 determine that the other storage device(s) are located in a remote node, such as a computing device, storage array, etc., that is remote from computing device 100, then instructions 126 may determine to read the requested data from SCM read cache

150 regardless of the exceeded SCM read queue depth threshold 137 of controller 102. In such examples, it may be more beneficial to read the data from the SCM read cache 150 (even though the SCM read queue depth threshold 137 is exceeded) rather than read the requested data from a remote node, which may involve significantly higher latency than reading from any local storage device of backend storage 160 of computing device 100.

In some examples, when instructions 126 determine that the other storage device(s) are local to computing device 100 (e.g., in backend storage 160), then instructions 126 may further determine a current utilization of those other storage device(s). In such examples, if the current utilization of one or more of those storage device(s) is greater than a utilization threshold, then instructions 126 may determine to proceed with reading the requested data from SCM read cache 150 regardless of exceeded SCM read queue depth threshold 137. In such examples, it may be more beneficial to proceed with reading the data from the SCM read cache 150 rather than the other storage device(s), as the relatively high utilization of those storage device(s) may lead to significantly higher latency in the read compared to when the storage device(s) have lower utilization. In other examples, when instructions 126 determine that the other storage device(s) are local to computing device 100 (e.g., in backend storage 160) and have current utilization that is below the threshold, then instructions 126 may determine to proceed with bypassing SCM read cache 150 and read from the other storage device(s) (e.g., of backend storage 160) at 430. In such examples, the location and utilization of the other storage device(s) may be such that it may be more beneficial to read from those storage device(s) rather than SCM read cache 150 when the SCM read queue depth threshold is exceeded. In such examples, instructions 126 may intelligently determine, on a case-by-case basis, whether it is preferable to bypass the SCM read cache 150 or not, when the SCM read queue depth threshold 137 is exceeded, based on conditions related to the particular storage device(s) from which the read would otherwise happen. In such examples, this individualized determination for different IOs and different backend storage device(s) may lead to overall reduced latency in storage system 101. In examples described herein, any suitable measure of the utilization of storage device(s) may be used by instructions 126 at block 630. For example, the utilization of a storage device (e.g., a physical storage device, such as a HDD, a SSD, or the like) may be based on the number of outstanding IOs to the storage device at a given time. In such examples, a maximum utilization of the storage device may be represented by a maximum number of IOs that may be permitted to be outstanding at the storage device at one time. In such examples, the utilization of a storage device may be represented as the actual number of IOs outstanding, or as a proportion of the maximum IOs permitted to be outstanding (e.g., 50%, 100%, etc.). In such examples, the utilization threshold may be set as a fixed number of IOs or as a threshold percentage of the maximum utilization (e.g., 50%). In other examples, other measures of utilization may be used.

In some examples, computing device 100 may comprise a plurality of SCM read caches. In such examples, instructions 121 may be executable to perform the functionalities described herein in relation to instructions 121 independently for each of the plurality of SCM read caches. In such examples, instructions 121 may maintain operational data, such as operational data 130 of FIG. 4, for each of the SCM read caches (e.g., SCM queue depth(s), SCM queue depth threshold(s), etc.). In examples described herein, computing device 500 may determine an appropriate one of the SCM read caches for any given IO request (e.g., via a deterministic process based on an address, etc.).

In examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example illustrated in FIG. 1, storage medium 120 and storage medium 117 may each be implemented by one machine-readable storage medium, or multiple machine-readable storage media.

In examples described herein, a storage array may be a computing device comprising a plurality of storage devices and one or more controllers to interact with host devices and control access to the storage devices. In some examples, the storage devices may include HDDs, SSDs, or any other suitable type of storage device, or any combination thereof. In some examples, the controller(s) may virtualize the storage capacity provided by the storage devices to enable a host to access a virtual object (e.g., a volume) made up of storage space from multiple different storage devices.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein. All of the features disclosed in this specification (including any accompanying claims, abstract and drawings), and/or all of the elements of any method or process so disclosed, may be combined in any combination, except combinations where at least some of such features and/or elements are mutually exclusive. For example, functionalities described herein in relation to any of FIGS. 1-6 may be provided in combination with functionalities described herein in relation to any other of FIGS. 1-6.

What is claimed is:

1. A method of a storage system comprising:
   determining, with a first controller of the storage system, a representative input/output (IO) request latency between the first controller and a storage class memory (SCM) read cache during a given time period in which the first controller and a second controller of the storage system are sending IO requests to the SCM read cache, the first and second controllers each comprising a respective main cache, and the storage system comprising backend storage;
   adjusting at least one SCM queue depth threshold of the first controller, in response to a determination that the determined representative IO request latency exceeds an IO request latency threshold for the SCM read cache;
   in response to an IO request of the first controller for the SCM read cache, comparing an SCM queue depth of the first controller to one of the at least one SCM queue depth threshold of the first controller;
   selecting between processing the IO request using the SCM read cache, dropping the IO request, and processing the IO request without using the SCM read cache, based on a type of the IO request and a result of the comparison; and
   performing the selected processing or dropping in response to the selection.

2. The method of claim 1, further comprising:
   determining a first total amount of data read from and written to the SCM read cache by the first controller during the given time period; and
   determining an estimated cumulative amount of data read from and written to the SCM read cache by the first and second controllers during the given time period, based on the determined representative IO request latency for the given time period and performance data for the SCM read cache.

3. The method of claim 2, wherein the determining the estimated total amount of data comprises:
   determining the estimated cumulative amount of data to be an amount of data corresponding to the determined representative IO request latency in the performance data for the SCM read cache, wherein the representative IO request latency is an average IO request latency between the first controller and the SCM read cache during the given time period.

4. The method of claim 2, further comprising:
   determining, based on the first total amount of data and the estimated cumulative amount of data, an amount to adjust the at least one SCM queue depth threshold of the first controller.

5. The method of claim 4, wherein the determining the amount to adjust the at least one SCM queue depth threshold comprises:
   determining the amount to adjust the at least one SCM queue depth threshold to be a proportion of a defined adjustment amount, the proportion based on a ratio of the first total amount of data and the estimated cumulative amount of data.

6. The method of claim 1, wherein:
   the selecting comprises selecting to drop the IO request, based on a determination that the IO request is a request to destage data to the SCM read cache and the result of the comparison indicating that an SCM write queue depth of the first controller is greater than an SCM write queue depth threshold of the first controller; and
   the performing comprises dropping the IO request without writing the data to the SCM read cache or the backend storage, in response to the selection.

7. The method of claim 1, wherein:
   the selecting comprises selecting to process the IO request without using the SCM read cache, based on a determination that the IO request is a read request for requested data and the result of the comparison indicating that an SCM read queue depth of the first controller is greater than an SCM read queue depth threshold of the first controller; and
   the performing comprises bypassing the SCM read cache and reading the requested data from at least one of backend storage of the storage system or a remote computing device into the main cache of the first controller.

8. The method of claim 1, wherein:
   the selecting comprises selecting to process the IO request using the SCM read cache, based on a determination that the IO request is a request to destage data to the SCM read cache and the result of the comparison indicating that an SCM write queue depth of the first controller is not greater than an SCM write queue depth threshold of the first controller; and the performing comprises destaging the data to the SCM read cache, based on the selection.

9. The method of claim 1, wherein:

the selecting comprises selecting to process the IO request using the SCM read cache, based on a determination that the IO request is a read request to read requested data from the SCM read cache and the result of the comparison indicating that an SCM read queue depth of the first controller is not greater than an SCM read queue depth threshold of the first controller; and the performing comprises reading the requested data from the SMC read cache, based on the selection.

10. An article comprising at least one non-transitory machine-readable storage medium comprising instructions executable by at least one processing resource of a storage system to:

determine a representative input/output (IO) request latency between a first controller of the storage system and a storage class memory (SCM) read cache during a given time period in which the first controller and a second controller of the storage system are sending IO requests to the SCM read cache;

adjust an SCM read queue depth threshold or an SCM write queue depth threshold of the first controller based on a determination that the determined representative IO request latency exceeds an IO request latency threshold for the SCM read cache;

drop a destage request at the first controller, when an SCM write queue depth of the first controller is greater than the SCM write queue depth threshold; and in response to a request, of the first controller, to read requested data from the SCM read cache, bypass the SCM read cache and read the requested data from backend storage of the storage system or from a remote computing device into a main cache of the first controller, when the SCM read queue depth of the first controller is greater than the SCM read queue depth threshold.

11. The article of claim 10, wherein the instructions are executable by the at least one processing resource to:

based on a determination that the representative IO request latency exceeds the IO request latency threshold for the SCM read cache, perform one of:

when the SCM write queue depth threshold is above a first minimum value, decrease the SCM write queue depth threshold;

when the SCM write queue depth threshold has the first minimum value and the SCM read queue depth threshold is above a second minimum value, decrease the SCM read queue depth threshold; and when the SCM write queue depth threshold has the first minimum value and the SCM read queue depth threshold has the second minimum value, decrease neither the SCM write queue depth threshold nor the SCM read queue depth threshold.

12. The article of claim 11, wherein the instructions are executable by the at least one processing resource to:

determine a first total amount of data read from and written to the SCM read cache by the first controller during the given time period; and determine an estimated cumulative amount of data read from and written to the SCM read cache by the first and second controllers during the given time period, based on the determined representative IO request latency for the given time period and performance data for the SCM read cache; and determine an amount to decrease the SCM read queue depth threshold or the SCM write queue depth threshold to be a proportion of a defined adjustment amount, the proportion based on a ratio of the first total amount of data and the estimated cumulative amount of data.

13. The article of claim 10, wherein the instructions are executable by the at least one processing resource to:

based on a determination that the representative IO request latency does not exceed the IO request latency threshold for the SCM read cache, perform one of:

when the SCM read queue depth threshold is below a first maximum value, increase the SCM read queue depth threshold;

when the SCM read queue depth threshold has the first maximum value and the SCM write queue depth threshold is below a second maximum value, increase the SCM write queue depth threshold; and when the SCM read queue depth threshold has the first maximum value and the SCM write queue depth threshold has the second maximum value, increase neither the SCM read queue depth threshold nor the SCM write queue depth threshold.

14. The article of claim 13, wherein the instructions are executable by the at least one processing resource to:

determine a first total amount of data read from and written to the SCM read cache by the first controller during the given time period; and determine an estimated cumulative amount of data read from and written to the SCM read cache by the first and second controllers during the given time period, based on the determined representative IO request latency for the given time period, and performance data for the SCM read cache; and determine an amount to increase the SCM read queue depth threshold or the SCM read queue depth threshold to be a proportion of a defined adjustment amount, the proportion based on a ratio of the first total amount of data and the estimated cumulative amount of data.

15. The article of claim 10, wherein the instructions are executable by the at least one processing resource to:

in response to the destage request, destage data associated with the destage request from the main cache to the SCM read cache, when the SCM write queue depth of the first controller is not greater than the SCM write queue depth threshold; and in response to the destage request, when the SCM write queue depth of the first controller is greater than the SCM write queue depth threshold, and allow the data associated with the destage request to be removed from the main cache without destaging the data to the SCM read cache.

16. The article of claim 10, wherein the instructions are executable by the at least one processing resource to, for each of a plurality of successive time periods, including the given time period:

accumulate a total amount of data read from and written to the SCM read cache by via IO requests of the first controller during the time period;

accumulate a total latency for each of the IO requests of the first controller to the SCM read cache during the time period;

accumulate a total number of the IO requests of the first controller to the SCM read cache during the time period;

when the time period has elapsed, determine whether the IO request latency threshold for the SCM read cache is exceeded in the time period based on the accumulated total latency and the accumulated total number of IO request for the first controller to the SCM for the time period;

adjust at least one of the SCM read queue depth threshold and the SCM write queue depth threshold for the SCM read cache in response to a determination that the IO request latency threshold for the SCM read cache is exceeded for the time period; and reset each of the total amount of data, the total latency, and the total number of IO requests to zero in preparation for the next time period.

17. A storage system comprising:
first and second controllers;
a dual-ported storage class memory (SCM) read cache to receive and process IO requests from each of the first and second controllers;
backend storage; and
at least one non-transitory machine-readable storage medium comprising instructions executable by the at least one processing resource of the first controller to:
determine an representative input/output (IO) request latency between the first controller the SCM read cache during a given time period;
adjust an SCM queue depth threshold of the first controller, based on a determination that the representative IO request latency exceeds an IO request latency threshold for the SCM;
in response to a request to destage data to the SCM read cache, drop the destage request without writing the data to the SCM read cache, when an SCM write queue depth is greater than an SCM write queue depth threshold of the first controller; and
in response to a request to read requested data from the SCM read cache, bypass the SCM read cache and read the requested data from the backend storage or from a remote computing device, when an SCM read queue depth is greater than the SCM read queue depth threshold of the first controller.

18. The storage system of claim 17, wherein:
the SCM read cache comprises a read cache implemented by an SCM device having lower latency than a serial attached SCSI (SAS) solid state drive (SSD); and
the SCM device is to communicate with other components of the storage system using a protocol consistent with NVM Express™ (NVMe™).

19. The storage system of claim 17, wherein:
the SCM read cache comprises a read cache implemented by an SCM device having no flash translation layer (FTL) and having lower latency than a solid state drive (SSD) comprising an FTL.

20. The storage system of claim 19, wherein:
the instructions are executable to read the requested data from the SCM read cache into a main cache of the first controller, wherein the main cache comprises volatile memory; and
the backend storage comprises one or more non-volatile storage devices, wherein the non-volatile storage devices comprise at least one of hard-disk drives (HDDs) or solid state drives (SSDs), or a combination of HDDs and SSDs.

* * * * *